United States Patent
Khoury et al.

(10) Patent No.: US 12,175,983 B2
(45) Date of Patent: *Dec. 24, 2024

(54) SPEAKER RECOGNITION IN THE CALL CENTER

(71) Applicant: PINDROP SECURITY, INC., Atlanta, GA (US)

(72) Inventors: Ellie Khoury, Atlanta, GA (US); Matthew Garland, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,911

(22) Filed: Feb. 8, 2024

(65) Prior Publication Data
US 2024/0212688 A1  Jun. 27, 2024

Related U.S. Application Data

(63) Continuation of application No. 18/329,138, filed on Jun. 5, 2023, which is a continuation of application
(Continued)

(51) Int. Cl.
*G10L 17/00* (2013.01)
*G06N 7/01* (2023.01)
(Continued)

(52) U.S. Cl.
CPC ............... *G10L 17/00* (2013.01); *G06N 7/01* (2023.01); *G10L 15/07* (2013.01); *G10L 15/26* (2013.01);
(Continued)

(58) Field of Classification Search
CPC ........ G06F 40/295; G06F 40/35; G06F 40/30; G06F 40/20; G10L 15/02;
(Continued)

(56) References Cited

U.S. PATENT DOCUMENTS 4,817,156 A  3/1989  Bahl et al.
4,829,577 A  5/1989  Kuroda et al.
(Continued)

FOREIGN PATENT DOCUMENTS

WO   WO-2015/079885 A1   6/2015
WO   WO-2016/195261 A1   12/2016
WO   WO-2017/167900 A1   10/2017

OTHER PUBLICATIONS

M. Witkowski, M. Igras, J. Grzybowska, P. Jaciów, J. Gałka and M. Ziółko, "Caller identification by voice," XXII Annual Pacific Voice Conference (PVC), Krakow, Poland, 2014, pp. 1-7, doi: 10.1109/PVC.2014.6845420. (Year: 2014).*
(Continued)

*Primary Examiner* — Edgar X Guerra-Erazo
(74) *Attorney, Agent, or Firm* — Foley & Lardner LLP

(57) ABSTRACT

Utterances of at least two speakers in a speech signal may be distinguished and the associated speaker identified by use of diarization together with automatic speech recognition of identifying words and phrases commonly in the speech signal. The diarization process clusters turns of the conversation while recognized special form phrases and entity names identify the speakers. A trained probabilistic model deduces which entity name(s) correspond to the clusters.

20 Claims, 12 Drawing Sheets

Related U.S. Application Data

No. 16/895,750, filed on Jun. 8, 2020, now Pat. No. 11,670,304, which is a continuation of application No. 16/442,368, filed on Jun. 14, 2019, now Pat. No. 10,679,630, which is a continuation of application No. 15/709,290, filed on Sep. 19, 2017, now Pat. No. 10,325,601.

(60) Provisional application No. 62/396,670, filed on Sep. 19, 2016.

(51) Int. Cl.
  *G10L 15/07* (2013.01)
  *G10L 15/26* (2006.01)
  *G10L 17/04* (2013.01)
  *G10L 17/08* (2013.01)
  *G10L 17/24* (2013.01)
  *H04M 1/27* (2006.01)

(52) U.S. Cl.
  CPC ............ *G10L 17/04* (2013.01); *G10L 17/08* (2013.01); *G10L 17/24* (2013.01); *H04M 1/271* (2013.01); *H04M 2203/40* (2013.01)

(58) Field of Classification Search
  CPC ........... G10L 2015/025; G10L 15/1815; G10L 15/22; G10L 15/32; G10L 25/51; G10L 15/16; G10L 15/187; G10L 15/30; G10L 2015/088; G10L 15/24; G10L 17/00; G10L 17/02; G10L 17/10; G10L 17/22; G10L 17/26; G10L 25/78; G10L 25/87; G10L 25/27; G10L 25/30; G10L 25/45; G10L 21/045; G10L 21/04
  See application file for complete search history.

(56) References Cited

U.S. PATENT DOCUMENTS

| | | | |
|---|---|---|---|
| 4,972,485 | A | 11/1990 | Dautrich et al. |
| 5,072,452 | A | 12/1991 | Brown et al. |
| 5,461,697 | A | 10/1995 | Nishimura et al. |
| 5,475,792 | A | 12/1995 | Stanford et al. |
| 5,598,507 | A | 1/1997 | Kimber et al. |
| 5,659,662 | A | 8/1997 | Wilcox et al. |
| 5,835,890 | A | 11/1998 | Matsui et al. |
| 5,867,562 | A | 2/1999 | Scherer |
| 5,949,874 | A | 9/1999 | Mark |
| 5,995,927 | A | 11/1999 | Li |
| 6,009,392 | A | 12/1999 | Kanevsky et al. |
| 6,021,119 | A | 2/2000 | Derks et al. |
| 6,055,498 | A | 4/2000 | Neumeyer et al. |
| 6,094,632 | A | 7/2000 | Hattori |
| 6,141,644 | A | 10/2000 | Kuhn et al. |
| 6,411,930 | B1 | 6/2002 | Burges |
| 6,463,413 | B1 | 10/2002 | Applebaum et al. |
| 6,519,561 | B1 | 2/2003 | Farrell et al. |
| 6,760,701 | B2 | 7/2004 | Sharma et al. |
| 6,882,972 | B2 | 4/2005 | Kompe et al. |
| 6,922,668 | B1 | 7/2005 | Downey |
| 6,975,708 | B1 | 12/2005 | Scherer |
| 7,003,460 | B1 | 2/2006 | Bub et al. |
| 7,209,881 | B2 | 4/2007 | Yoshizawa et al. |
| 7,295,970 | B1 | 11/2007 | Gorin et al. |
| 7,318,032 | B1 | 1/2008 | Chaudhari et al. |
| 7,324,941 | B2 | 1/2008 | Choi et al. |
| 7,739,114 | B1 | 6/2010 | Chen et al. |
| 7,813,927 | B2 | 10/2010 | Navratil et al. |
| 8,046,230 | B1 | 10/2011 | McIntosh |
| 8,112,160 | B2 | 2/2012 | Foster |
| 8,160,811 | B2 | 4/2012 | Prokhorov |
| 8,160,877 | B1 | 4/2012 | Nucci et al. |
| 8,380,503 | B2 | 2/2013 | Gross |
| 8,385,536 | B2 | 2/2013 | Whitehead |
| 8,484,023 | B2 | 7/2013 | Kanevsky et al. |
| 8,484,024 | B2 | 7/2013 | Kanevsky et al. |
| 8,554,563 | B2 | 10/2013 | Aronowitz |
| 8,712,760 | B2 | 4/2014 | Hsia et al. |
| 8,738,442 | B1 | 5/2014 | Liu et al. |
| 8,856,895 | B2 | 10/2014 | Perrot |
| 8,886,663 | B2 | 11/2014 | Gainsboro et al. |
| 8,903,859 | B2 | 12/2014 | Zeppenfeld et al. |
| 9,042,867 | B2 | 5/2015 | Gomar |
| 9,064,491 | B2 | 6/2015 | Rachevsky et al. |
| 9,277,049 | B1 | 3/2016 | Danis |
| 9,336,781 | B2 | 5/2016 | Scheffer et al. |
| 9,338,619 | B2 | 5/2016 | Kang |
| 9,343,067 | B2 | 5/2016 | Ariyaeeinia et al. |
| 9,344,892 | B1 | 5/2016 | Rodrigues et al. |
| 9,355,646 | B2 | 5/2016 | Oh et al. |
| 9,373,330 | B2 | 6/2016 | Cumani et al. |
| 9,401,143 | B2 | 7/2016 | Senior et al. |
| 9,401,148 | B2 | 7/2016 | Lei et al. |
| 9,406,298 | B2 | 8/2016 | Cumani et al. |
| 9,431,016 | B2 | 8/2016 | Aviles-Casco et al. |
| 9,444,839 | B1 | 9/2016 | Faulkner et al. |
| 9,454,958 | B2 | 9/2016 | Li et al. |
| 9,460,722 | B2 | 10/2016 | Sidi et al. |
| 9,466,292 | B1 | 10/2016 | Lei et al. |
| 9,502,038 | B2 | 11/2016 | Wang et al. |
| 9,514,753 | B2 | 12/2016 | Sharifi et al. |
| 9,558,755 | B1 | 1/2017 | Laroche et al. |
| 9,584,946 | B1 | 2/2017 | Lyren et al. |
| 9,620,145 | B2 | 4/2017 | Bacchiani et al. |
| 9,626,971 | B2 | 4/2017 | Rodriguez et al. |
| 9,633,652 | B2 | 4/2017 | Kurniawati et al. |
| 9,641,954 | B1 | 5/2017 | Typrin et al. |
| 9,665,823 | B2 | 5/2017 | Saon et al. |
| 9,685,174 | B2 | 6/2017 | Karam et al. |
| 9,729,727 | B1 | 8/2017 | Zhang |
| 9,818,431 | B2 | 11/2017 | Yu |
| 9,824,692 | B1 | 11/2017 | Khoury et al. |
| 9,860,367 | B1 | 1/2018 | Jiang et al. |
| 9,875,739 | B2 | 1/2018 | Ziv et al. |
| 9,875,742 | B2 | 1/2018 | Gorodetski et al. |
| 9,875,743 | B2 | 1/2018 | Gorodetski et al. |
| 9,881,617 | B2 | 1/2018 | Sidi et al. |
| 9,930,088 | B1 | 3/2018 | Hodge |
| 9,984,706 | B2 | 5/2018 | Wein |
| 10,277,628 | B1 | 4/2019 | Jakobsson |
| 10,325,601 | B2 | 6/2019 | Khoury et al. |
| 10,347,256 | B2 | 7/2019 | Khoury et al. |
| 10,397,398 | B2 | 8/2019 | Gupta |
| 10,404,847 | B1 | 9/2019 | Unger |
| 10,462,292 | B1 | 10/2019 | Stephens |
| 10,506,088 | B1 | 12/2019 | Singh |
| 10,554,821 | B1 | 2/2020 | Koster |
| 10,638,214 | B1 | 4/2020 | Delhoume et al. |
| 10,659,605 | B1 | 5/2020 | Braundmeier et al. |
| 10,679,630 | B2 * | 6/2020 | Khoury .................. G06N 7/01 |
| 10,854,205 | B2 | 12/2020 | Khoury et al. |
| 11,069,352 | B1 | 7/2021 | Tang et al. |
| 11,670,304 | B2 * | 6/2023 | Khoury .................. G10L 15/26 |
| | | | 704/246 |
| 2002/0095287 | A1 | 7/2002 | Botterweck |
| 2002/0143539 | A1 | 10/2002 | Botterweck |
| 2003/0231775 | A1 | 12/2003 | Wark |
| 2003/0236663 | A1 | 12/2003 | Dimitrova et al. |
| 2004/0218751 | A1 | 11/2004 | Colson et al. |
| 2004/0230420 | A1 | 11/2004 | Kadambe et al. |
| 2005/0038655 | A1 | 2/2005 | Mutel et al. |
| 2005/0039056 | A1 | 2/2005 | Bagga et al. |
| 2005/0286688 | A1 | 12/2005 | Scherer |
| 2006/0058998 | A1 | 3/2006 | Yamamoto et al. |
| 2006/0111905 | A1 | 5/2006 | Navratil et al. |
| 2006/0293771 | A1 | 12/2006 | Tazine et al. |
| 2007/0189479 | A1 | 8/2007 | Scherer |
| 2007/0198257 | A1 | 8/2007 | Zhang et al. |
| 2007/0294083 | A1 | 12/2007 | Bellegarda et al. |
| 2008/0195389 | A1 | 8/2008 | Zhang et al. |
| 2008/0312926 | A1 | 12/2008 | Vair et al. |
| 2009/0138712 | A1 | 5/2009 | Driscoll |
| 2009/0265328 | A1 | 10/2009 | Parekh et al. |

(56) References Cited

U.S. PATENT DOCUMENTS

| | | |
|---|---|---|
| 2010/0131273 A1 | 5/2010 | Aley-Raz et al. |
| 2010/0217589 A1 | 8/2010 | Gruhn et al. |
| 2010/0232619 A1 | 9/2010 | Uhle et al. |
| 2010/0262423 A1 | 10/2010 | Huo et al. |
| 2011/0010173 A1 | 1/2011 | Scott et al. |
| 2012/0173239 A1 | 7/2012 | Asenjo et al. |
| 2012/0185418 A1 | 7/2012 | Capman et al. |
| 2013/0041660 A1 | 2/2013 | Waite |
| 2013/0080165 A1 | 3/2013 | Wang et al. |
| 2013/0109358 A1 | 5/2013 | Balasubramaniyan et al. |
| 2013/0300939 A1 | 11/2013 | Chou et al. |
| 2014/0046878 A1 | 2/2014 | Lecomte et al. |
| 2014/0053247 A1 | 2/2014 | Fadel |
| 2014/0081640 A1 | 3/2014 | Farrell et al. |
| 2014/0195236 A1 | 7/2014 | Hosom et al. |
| 2014/0214417 A1 | 7/2014 | Wang et al. |
| 2014/0214676 A1 | 7/2014 | Bukai |
| 2014/0241513 A1 | 8/2014 | Springer |
| 2014/0250512 A1 | 9/2014 | Goldstone et al. |
| 2014/0278412 A1 | 9/2014 | Scheffer et al. |
| 2014/0288928 A1 | 9/2014 | Penn et al. |
| 2014/0337017 A1 | 11/2014 | Watanabe et al. |
| 2015/0036813 A1 | 2/2015 | Ananthakrishnan et al. |
| 2015/0127336 A1 | 5/2015 | Lei et al. |
| 2015/0149165 A1 | 5/2015 | Saon |
| 2015/0161522 A1 | 6/2015 | Saon et al. |
| 2015/0189086 A1 | 7/2015 | Romano et al. |
| 2015/0199960 A1 | 7/2015 | Huo et al. |
| 2015/0269931 A1 | 9/2015 | Senior et al. |
| 2015/0269941 A1 | 9/2015 | Jones |
| 2015/0301796 A1* | 10/2015 | Visser .................. G10L 17/22 |
| | | 715/728 |
| 2015/0310008 A1 | 10/2015 | Thudor et al. |
| 2015/0334231 A1 | 11/2015 | Rybak et al. |
| 2015/0348571 A1 | 12/2015 | Koshinaka et al. |
| 2015/0356630 A1 | 12/2015 | Hussain |
| 2015/0365530 A1 | 12/2015 | Kolbegger et al. |
| 2016/0019458 A1 | 1/2016 | Kaufhold |
| 2016/0019883 A1 | 1/2016 | Aronowitz |
| 2016/0028434 A1 | 1/2016 | Kerpez et al. |
| 2016/0078863 A1 | 3/2016 | Chung et al. |
| 2016/0104480 A1 | 4/2016 | Sharifi |
| 2016/0125877 A1 | 5/2016 | Foerster et al. |
| 2016/0180214 A1 | 6/2016 | Kanevsky et al. |
| 2016/0189707 A1 | 6/2016 | Donjon et al. |
| 2016/0240190 A1 | 8/2016 | Lee et al. |
| 2016/0275953 A1 | 9/2016 | Sharifi et al. |
| 2016/0284346 A1 | 9/2016 | Visser et al. |
| 2016/0293167 A1 | 10/2016 | Chen et al. |
| 2016/0314790 A1 | 10/2016 | Tsujikawa et al. |
| 2016/0343373 A1 | 11/2016 | Ziv et al. |
| 2017/0060779 A1 | 3/2017 | Falk |
| 2017/0069313 A1 | 3/2017 | Aronowitz |
| 2017/0069327 A1 | 3/2017 | Heigold et al. |
| 2017/0098444 A1 | 4/2017 | Song |
| 2017/0111515 A1 | 4/2017 | Bandyopadhyay et al. |
| 2017/0126884 A1 | 5/2017 | Balasubramaniyan et al. |
| 2017/0142150 A1 | 5/2017 | Sandke et al. |
| 2017/0169816 A1 | 6/2017 | Blandin et al. |
| 2017/0230390 A1 | 8/2017 | Faulkner et al. |
| 2017/0262837 A1 | 9/2017 | Gosalia |
| 2018/0082691 A1 | 3/2018 | Khoury et al. |
| 2018/0152558 A1 | 5/2018 | Chan et al. |
| 2018/0249006 A1 | 8/2018 | Dowlatkhah et al. |
| 2018/0295235 A1 | 10/2018 | Tatourian et al. |
| 2018/0337962 A1 | 11/2018 | Ly et al. |
| 2019/0037081 A1 | 1/2019 | Rao et al. |
| 2019/0172476 A1 | 6/2019 | Wung et al. |
| 2019/0174000 A1 | 6/2019 | Bharrat et al. |
| 2019/0180758 A1 | 6/2019 | Washio |
| 2019/0238956 A1 | 8/2019 | Gaubitch et al. |
| 2019/0297503 A1 | 9/2019 | Traynor et al. |
| 2020/0137221 A1 | 4/2020 | Dellostritto et al. |
| 2020/0195779 A1 | 6/2020 | Weisman et al. |
| 2020/0252510 A1 | 8/2020 | Ghuge et al. |
| 2020/0312313 A1 | 10/2020 | Maddali et al. |
| 2020/0396332 A1 | 12/2020 | Gayaldo |
| 2021/0084147 A1 | 3/2021 | Kent et al. |
| 2021/0150010 A1 | 5/2021 | Strong et al. |
| 2023/0326462 A1* | 10/2023 | Khoury .................. G10L 17/00 |
| | | 704/246 |

OTHER PUBLICATIONS

J. H. L. Hansen and T. Hasan, "Speaker Recognition by Machines and Humans: A tutorial review," in IEEE Signal Processing Magazine, vol. 32, No. 6, pp. 74-99, Nov. 2015, doi: 10.1109/MSP.2015.2462851. (Year: 2015).*

T. F. Zheng, Q. Jin, L. Li, J. Wang and F. Bie, "An overview of robustness related issues in speaker recognition," Signal and Information Processing Association Annual Summit and Conference (APSIPA), 2014 Asia-Pacific, Siem Reap, Cambodia, 2014, pp. 1-10, doi: 10.1109/APSIPA.2014.7041826 (Year: 2014).*

J. Navratil, J. Kleindienst and S. H. Maes, "An instantiable speech biometrics module with natural language interface: implementation in the telephony environment," 2000 IEEE Int'l Conference on Acoustics, Speech, and Signal Processing. Proceedings, Istanbul, Turkey, 2000, pp. II1097-II1100 vol.2 (Year: 2000).*

First Examiner's Requisition on CA App. 3,179,080 dated Apr. 9, 2024 (3 pages).

Ahmad et al., "A Unique Approach in Text Independent Speaker Recognition using MFCC Feature Sets and Probabilistic Neural Network", Eighth International Conference on Advances in Pattern Recognition (ICAPR}, IEEE, 2015 (6 pages).

Almaadeed, et al., "Speaker identification using multimodal neural networks and wavelet analysis, "IET Biometrics 4.1 (2015), 18-28.

Atrey, et al., "Audio based event detection for multimedia surveillance", Acoustics, Speech and Signal Processing, 2006, ICASSP 2006 Proceedings, 2006 IEEE International Conference on vol. 5, IEEE, 2006. pp. 813-816.

Australian Examination Report on AU Appl. Ser. No. 2021286422 dated Oct. 21, 2022 (2 pages).

Baraniuk, "Compressive Sensing [Lecture Notes]", IEEE Signal Processing Magazine, vol. 24, Jul. 2007, 4 pages.

Bredin, "TristouNet: Triplet Loss for Speaker Turn Embedding", Arxiv.org, Cornell University Library, 201 Olin Library Cornell University Ithaca, NY 14853, Sep. 14, 2016, XP080726602.

Buera et al., "Unsupervised Data-Driven Feature Vector Normalization With Acoustic Model Adaptation for Robust Speech Recognition", IEEE Transactions on Audio, Speech, and Language Processing, vol. 18, No. 2, Feb. 2010, pp. 296-309 (14 pages).

Campbell, "Using Deep Belief Networks for Vector-Based Speaker Recognition", Proceedings of Interspeech 2014, Sep. 14, 2014, pp. 676-680, XP055433784.

Castaldo et al., "Compensation of Nuisance Factors for Speaker and Language Recognition," IEEE Transactions on Audio, Speech and Language Processing, ieeexplore.ieee.org, vol. 15, No. 7, Sep. 2007. pp. 1969-1978.

Communication pursuant to Article 94(3) EPC issued in EP Application No. 17 772 184.2-1207 dated Jul. 19, 2019.

Communication pursuant to Article 94(3) EPC on EP 17772184.2 dated Jun. 18, 2020.

Cumani, et al., "Factorized Sub-space Estimation for Fast and Memory Effective I-Vector Extraction", IEEE/ACM TASLP, vol. 22, Issue 1, Jan. 2014, 28 pages.

D.Etter and C.Domniconi, "Multi2Rank: Multimedia Multiview Ranking," 2015 IEEE International Conference on Multimedia Big Data, 2015, pp. 80-87. (Year 2015).

Dehak, et al., "Front-End Factor Analysis for Speaker Verification", IEEE Transactions on Audio, Speech, and Language Processing, vol. 19, No. 4, May 2011, pp. 788-798.

Douglas A. Reynolds et al., "Speaker Verification Using Adapted Gaussian Mixture Models," Digital Signal Processing 10, 2000, pp. 19-41.

Examination Report for EP 17778046.7 dated Jun. 16, 2020 (4 pages).

(56) References Cited

OTHER PUBLICATIONS

Examination Report for IN 201947014575 dated Nov. 16, 2021 (6 pages).
Examination Report No. 1 for AU 2017322591 dated Jul. 16, 2021 (2 pages).
Final Office Action for U.S. Appl. No. 16/200,283 dated Jun. 11, 2020 (15 pages).
Final Office Action for U.S. Appl. No. 16/784,071 dated Oct. 27, 2020 (12 pages).
Final Office Action on U.S. Appl. No. 15/872,639 dated Jan. 29, 2019 (11 pages).
Final Office Action on U.S. Appl. No. 17/121,291 dated Mar. 27, 2023 (7 pages).
Final Office Action on U.S. Appl. No. 16/829,705 dated Mar. 24, 2022 (23 pages).
First Examiner's Requisition for CA App. 3,135,210 dated Oct. 5, 2023 (5 pages).
First Examiners Requisition on CA Appl. 3,096,378 dated Jun. 12, 2023 (3 pages).
First Office Action issued in KR 10-2019-7010-7010208 dated Jun. 29, 2019. (5 pages).
First Office Action issued on CA Application No. 3,036,533 dated Apr. 12, 2019. (4 pages).
First Office Action on CA Application No. 3,075,049 dated May 7, 2020. (3 pages).
Florian et al., "FaceNet: A unified embedding for face recognition and clustering", 2015 IEEE Conference on Computer Vision and Pattern Recognition (CVPR), IEEE, Jun. 7, 2015, pp. 815-823, XP032793492, DOI: 10.1109/CVPR.2015.7298682.
Foreign Action on JP 2019-535198 dated Mar. 1, 2022 (6 pages).
Fu et al., "SNR-Aware Convolutional Neural Network Modeling for Speech Enhancement", Interspeech 2016, Sep. 8-12, 2016, pp. 3768-3772, XP055427533, ISSN: 1990-9772, DOI: 10.21437/Interspeech.2016-211 (5 pages).
Gao, et al., "Dimensionality reduction via compressive sensing", Pattern Recognition Letters 33, Elsevier Science BV 0167-8655, 2012. 8 pages.
Garcia-Romero et al., "Unsupervised Domain Adaptation for I-Vector Speaker Recgonition" Odyssey 2014, pp. 260-264.
Ghahabi Omid et al., "Restricted Boltzmann Machine Supervectors for Speaker Recognition", 2015 IEEE International Conference on acoustics, Speech and Signal Processing (ICASSP), IEEE, Apr. 19, 2015, XP033187673, pp. 4804-4808 (5 pages).
Gish, et al., "Segregation of Speakers for Speech Recognition and Speaker Identification", Acoustics, Speech, and Signal Processing, 1991, ICASSP-91, 1991 International Conference on IEEE, 1991. Pages 873-876.
Hoffer et al., "Deep Metric Learning Using Triplet Network", 2015, arXiv: 1412.6622v3, retrieved Oct. 4, 2021 from URL: https://deepsense.ai/wp-content/uploads/2017/08/1412.6622-3.pdf (8 pages).
Hoffer et al., "Deep Metric Learning Using Triplet Network," ICLR 2015 (workshop contribution), Mar. 23, 2015, pp. 1-8.
Huang, et al., "A Blind Segmentation Approach to Acoustic Event Detection Based on I-Vector", Interspeech, 2013. pp. 2282-2286.
Information Disclosure Statement filed Aug. 8, 2019.
Information Disclosure Statement filed Feb. 12, 2020 (4 pages).
International Preliminary Report on Patentability for PCT/US2020/017051 dated Aug. 19, 2021 (11 pages).
International Preliminary Report on Patentability, Ch. I, for PCT/US2017/039697 dated Jan. 1, 2019 (10 pages).
International Preliminary Report on Patentability, Ch. I, for PCT/US2017/052293 dated Mar. 19, 2019 (8 pages).
International Preliminary Report on Patentability, Ch. I, for PCT/US2017/052316 dated Mar. 19, 2019 (7 pages).
International Preliminary Report on Patentability, Ch. I, for PCT/US2017/052335 dated Mar. 19, 2019 (8 pages).
International Preliminary Report on Patentability, Ch. I, for PCT/US2020/026992 dated Oct. 21, 2021 (10 pages).
International Search Report and Written Opinion for PCT/US20/17051 dated Apr. 23, 2020 (12 pages).
International Search Report and Written Opinion for PCT/US2017/052335 dated Dec. 8, 2017 (10 pages).
International Search Report and Written Opinion for PCT/US2020/24709 dated Jun. 19, 2020 (10 pages).
International Search Report and Written Opinion issued in corresponding International Application No. PCT/US2018/013965 with Date of mailing May 14, 2018.
International Search Report and Written Opinion issued in International Application No. PCT/US20/26992 with Date of mailing Jun. 26, 2020.
International Search Report and Written Opinion issued in the corresponding International Application No. PCT/US2017/039697, mailed on Sep. 20, 2017. 17 pages.
International Search Report and Written Opinion of the International Searching Authority issued in corresponding International Application No. PCT/US2017/050927 with Date of mailing Dec. 11, 2017.
International Search Report and Written Opinion on PCT Appl. Ser. No. PCT/US2020/026992 dated Jun. 26, 2020 (11 pages).
International Search Report issued in corresponding International Application No. PCT/US2017/052293 dated Dec. 21, 2017.
International Search Report issued in corresponding International Application No. PCT/US2017/052316 with Date of mailing Dec. 21, 2017. 3 pages.
Kenny et al., "Deep Neural Networks for extracting Baum-Welch statistics for Speaker Recognition", Jun. 29, 2014, XP055361192, Retrieved from the Internet: URL:http://www.crim.ca/perso/patrick.kenny/stafylakis_odyssey2014_v2.pdf, [retrieved on Apr. 3, 2017].
Kenny, "A Small Footprint i-Vector Extractor" Proc. Odyssey Speaker and Language Recognition Workshop, Singapore, Jun. 25, 2012. 6 pages.
Khoury et al., "Combining Transcription-Based and Acoustic-Basedd Speaker Identifications for Broadcast News", ICASSP, Kyoto, Japan, 2012, pp. 4377-4380.
Khoury, et al., "Improvised Speaker Diariztion System for Meetings", Acoustics, Speech and Signal Processing, 2009, ICASSP 2009, IEEE International Conference on IEEE, 2009. pp. 4097-4100.
Kockmann et al., "Syllable based Feature-Contours for Speaker Recognition," Proc. 14th International Workshop on Advances, 2008. 4 pages.
Korean Office Action (with English summary), dated Jun. 29, 2019, issued in Korean application No. 10-2019-7010208, 6 pages.
Lei et al., "A Novel Scheme for Speaker Recognition Using a Phonetically-aware Deep Neural Network", Proceedings on ICASSP, Florence, Italy, IEEE Press, 2014, pp. 1695-1699.
Luque, et al., "Clustering Initialization Based on Spatial Information for Speaker Diarization of Meetings", Ninth Annual Conference of the International Speech Communication Association, 2008. pp. 383-386.
McLaren, et al., "Advances in deep neural network approaches to speaker recognition," In Proc. 40th IEEE International Conference on Acoustics, Speech and Signal Processing (ICASSP), 2015.
McLaren, et al., "Exploring the Role of Phonetic Bottleneck Features for Speaker and Language Recognition", 2016 IEEE International Conference on Acoustics, Speech and Signal Processing (ICASSP), Mar. 2016, pp. 5575-5579.
Meignier, et al., "Lium Spkdiarization: an Open Source Toolkit for Diarization" CMU SPUD Workshop, 2010. 7 pages.
Non-Final Office Action for U.S. Appl. No. 15/709,232 dated Jun. 27, 2019 (11 pages).
Non-Final Office Action for U.S. Appl. No. 15/709,232 dated Oct. 5, 2018 (21 pages).
Non-Final Office Action for U.S. Appl. No. 15/709,290 dated Oct. 5, 2018 (12 pages).
Non-Final Office Action for U.S. Appl. No. 16/200,283 dated Jan. 7, 2020 (10 pages).
Non-Final Office Action for U.S. Appl. No. 16/442,368 dated Oct. 4, 2019 (10 pages).
Non-Final Office Action for U.S. Appl. No. 16/784,071 dated May 12, 2020 (10 pages).
Non-Final Office Action for U.S. Appl. No. 16/829,705 dated Nov. 10, 2021 (20 pages).

(56) References Cited

OTHER PUBLICATIONS

Non-Final Office Action on U.S. Appl. No. 15/610,378 dated Mar. 1, 2018 (11 pages).
Non-Final Office Action on U.S. Appl. No. 16/551,327 dated Dec. 9, 2019 (7 pages).
Non-Final Office Action on U.S. Appl. No. 15/872,639 dated Aug. 23, 2018 (10 pages).
Non-Final Office Action on U.S. Appl. No. 16/829,705 dated Jul. 21, 2022 (27 pages).
Notice of Allowance for U.S. Appl. No. 15/610,378 dated Aug. 7, 2018 (5 pages).
Notice of Allowance for U.S. Appl. No. 15/709,024 dated Mar. 18, 2019 (11 pages).
Notice of Allowance for U.S. Appl. No. 15/709,232 dated Feb. 6, 2019 (11 pages).
Notice of Allowance for U.S. Appl. No. 15/709,232 dated Oct. 8, 2019 (11 pages).
Notice of Allowance for U.S. Appl. No. 15/709,290 dated Feb. 6, 2019 (6 pages).
Notice of Allowance for U.S. Appl. No. 16/200,283 dated Aug. 24, 2020 (7 pages).
Notice of Allowance for U.S. Appl. No. 16/442,368 dated Feb. 5, 2020 (7 pages).
Notice of Allowance for U.S. Appl. No. 16/505,452 dated Jul. 23, 2020 (8 pages).
Notice of Allowance for U.S. Appl. No. 16/505,452 dated May 13, 2020 (9 pages).
Notice of Allowance for U.S. Appl. No. 16/784,071 dated Jan. 27, 2021 (14 pages).
Notice of Allowance for U.S. Appl. No. 17/317,575 dated Jan. 28, 2022 (11 pages).
Notice of Allowance on U.S. Appl. No. 15/262,748 dated Sep. 13, 2017 (9 pages).
Notice of Allowance on U.S. Appl. No. 15/818,231 dated Mar. 27, 2019 (9 pages).
Notice of Allowance on U.S. Appl. No. 15/872,639 dated Apr. 25, 2019 (5 pages).
Notice of Allowance on U.S. Appl. No. 16/551,327 Dtd Mar. 26, 2020.
Notice of Allowance on U.S. Appl. No. 17/107,496 dated Jan. 26, 2023 (8 pages).
Notice of Allowance on U.S. Appl. No. 16/536,293 dated Jun. 3, 2022 (9 pages).
Notice of Allowance on U.S. Appl. No. 16/829,705 dated Dec. 21, 2022 (14 pages).
Notice of Allowance on U.S. Appl. No. 16/895,750 dated Jan. 25, 2023 (6 pages).
Notification of Transmittal of the International Search Report and the Written Opinion of the International Searching Authority, mailed May 14, 2018, in corresponding International Application No. PCT/US2018/013965, 13 pages.
Novoselov, et al., "SIC Speaker Recognition System for the NIST i-Vector Challenge." Odyssey: The Speaker and Language Recognition Workshop. Jun. 16-19, 2014. pp. 231-240.
Office Action for CA 3036561 dated Jan. 23, 2020 (5 pages).
Office Action on Japanese Application 2022-104204 dated Jul. 26, 2023 (4 pages).
Oguzhan et al., "Recognition of Acoustic Events Using Deep Neural Networks", 2014 22nd European Signal Processing Conference (EUSiPCO), Sep. 1, 2014, pp. 506-510 (5 pages).
Piegeon, et al., "Applying Logistic Regression to the Fusion of the NIST'99 1-Speaker Submissions", Digital Signal Processing Oct. 1-3, 2000. pp. 237-248.
Prazak et al., "Speaker Diarization Using PLDA-based Speaker Clustering", The 6th IEEE International Conference on Intelligent Data Acquisition and Advanced Computing Systems: Technology and Applications, Sep. 2011, pp. 347-350 (4 pages).
Prince, et al., "Probabilistic Linear Discriminant Analysis for Inferences About Identity," Proceedings of the International Conference on Computer Vision, Oct. 14-21, 2007. 8 pages.
Reasons for Refusal for JP 2019-535198 dated Sep. 10, 2021 (7 pages).
Reynolds et al., "Speaker Verification Using Adapted Gaussian Mixture Models," Digital Signal Processing 10, 2000, pp. 19-41.
Richardson, et al., "Channel Compensation for Speaker Recognition using MAP Adapted PLDA and Denoising DNNs", Proc. Speaker Lang. Recognit. Workshop, Jun. 22, 2016, pp. 225-230.
Richardson, et al., "Deep Neural Network Approaches to Speaker and Language Recognition", IEEE Signal Processing Letters, vol. 22, No. 10, Oct. 2015, pp. 1671-1675.
Richardson, et al., "Speaker Recognition Using Real vs Synthetic Parallel Data for DNN Channel Compensation", Interspeech, 2016. 6 pages.
Richardson, et al., Speaker Recognition Using Real vs Synthetic Parallel Data for DNN Channel Compensation, Interspeech, 2016, retrieved Sep. 14, 2021 from URL: https://www.ll.mit.edu/sites/default/files/publication/doc/2018-05/2016-Richardson-Interspeech.pdf (6 pages).
Rouvier et al., "An Open-source State-of-the-art Toolbox for Broadcast News Diarization", Interspeech, Aug. 2013, pp. 1477-1481 (5 pages).
Scheffer et al., "Content matching for short duration speaker recognition", Interspeech, Sep. 14-18, 2014, pp. 1317-1321.
Schmidt et al., "Large-Scale Speaker Identification" ICASSP, 2014, pp. 1650-1654.
Seddik, et al., "Text independent speaker recognition using the Mel frequency cepstral coefficients and a neural network classifier." First International Symposium on Control, Communications and Signal Processing, 2004. IEEE, 2004.
Shajeesh, et al., "Speech Enhancement based on Savitzky-Golay Smoothing Filter", International Journal of Computer Applications, vol. 57, No. 21, Nov. 2012, pp. 39-44 (6 pages).
Shum et al., "Exploiting Intra-Conversation Variability for Speaker Diarization", Interspeech, Aug. 2011, pp. 945-948 (4 pages).
Snyder et al., "Time Delay Deep Nueral Network-Based Universal Background Models for Speaker Recognition", IEEE Workshop on Automatic Speech Recognition and Understanding (ASRU), 2015, pp. 92-97 (6 pages).
Solomonoff, et al., "Nuisance Attribute Projection", Speech Communication, Elsevier Science BV, Amsterdam, The Netherlands, May 1, 2007. 74 pages.
Sturim et al., "Speaker Linking and Applications Using Non-parametric Hashing Methods," Interspeech, Sep. 2016, 5 pages.
Summons to attend oral proceedings pursuant to Rule 115(1) EPC issued in EP Application No. 17 772 184.2-1207 dated Dec. 16, 2019.
T.C.Nagavi, S.B. Anusha, P. Monisha and S.P. Poornima, "Content based audio retrieval with MFCC feature extraction, clustering and sort-merge techniquest," 2013 Fourth International Conference on Computing, Communications and Networking Technologies (ICCCNT), 2013, pp. 1-6. (Year 2013).
Temko, et al., "Acoustic event detection in meeting-room environments", Pattern Recognition Letters, vol. 30, No. 14, 2009, pp. 1281-1288.
Temko, et al., "Classification of acoustic events using SVM-based clustering schemes", Pattern Recognition, vol. 39, No. 4, 2006, pp. 682-694.
US Non Final Office Action on U.S. Appl. No. 17/107,496 dated Jul. 21, 2022 (7 pages).
US Non-Final Office Action on U.S. Appl. No. 17/121,291 dated Oct. 28, 2022 (11 pages).
US Non-Final Office Action on U.S. Appl. No. 16/895,750 dated Oct. 6, 2022 (10 pages).
US Non-Final Office Action on U.S. Appl. No. 17/706,398 dated Dec. 15, 2022 (5 pages).
US Notice of Allowance on U.S. Appl. No. 17/107,496 dated Sep. 28, 2022 (8 pages).
Uzan et al., "I Know That Voice: Identifying the Voice Actor Behind the Voice", 2015 International Conference on Biometrics (ICB), 2015, retrieved Oct. 4, 2021 from URL: https://citeseerx.ist.psu.edu/viewdoc/download?doi=10.1.1.715.8031&rep=rep1&type=pdf (6 pages).

(56) References Cited

OTHER PUBLICATIONS

Variani et al., "Deep neural networks for small footprint text-dependent speaker verification", 2014 IEEE International Conference on Acoustics, Speech and Signal Processing (ICASSP), IEEE, May 4, 2014, pp. 4052-4056, XP032617560, DOI: 10.1109/ICASSP.2014.6854363 [retrieved on Jul. 11, 2014].

Vella et al., "Artificial neural network features for speaker diarization", 2014 IEEE Spoken Language Technology Workshop (SLT), IEEE Dec. 7, 2014, pp. 402-406, XP032756972, DOI: 10.1109/SLT.2014.7078608.

Wang et al., "Learning Fine-Grained Image Similarity with Deep Ranking", Computer Vision and Pattern Recognition, Jan. 17, 2014, arXiv: 1404.4661v1, retrieved Oct. 4, 2021 from URL: https://arxiv.org/pdf/1404.4661.pdf (8 pages).

Xiang, et al., "Efficient text-independent speaker verification with structural Gaussian mixture models and neural network." IEEE Transactions on Speech and Audio Processing 11.5 (2003): 447-456.

Xu et al., "Rapid Computation of I-Vector" Odyssey, Bilbao, Spain, Jun. 21-24, 2016. 6 pages.

Xue et al., "Fast Query by Example of Enviornmental Sounds via Robust and Efficient Cluster-Based Indexing", Acoustics, Speech and Signal Processing (ICASSP), IEEE, 2008, pp. 5-8 (4 pages).

Yaman et al., "Bottleneck Features for Speaker Recognition", Proceedings of the Speaker and Language Recognition Workshop 2012, Jun. 28, 2012, pp. 105-108, XP055409424, Retrieved from the Internet: URL:https://pdfs.semanticscholar.org/3469/fe6e53e65bced5736480afe34b6c16728408.pdf [retrieved on Sep. 25, 2017].

Yella Sree Harsha et al., "Artificial neural network features for speaker diarization", 2014 IEEE Spoken Language technology Workshop (SLT), IEEE, Dec. 7, 2014, pp. 402-406, XP032756972, DOI: 10.1109/SLT.2014.7078608.

Zhang et al., "Extracting Deep Neural Network Bottleneck Features Using Low-Rank Matrix Factorization", IEEE, ICASSP, 2014. 5 pages.

Zheng, et al., "An Experimental Study of Speech Emotion Recognition Based on Deep Convolutional Neural Networks", 2015 International Conference on Affective Computing and Intelligent Interaction (ACII), 2015, pp. 827-831 (5 pages).

Third-Party Submission for U.S. Appl. No. 18/329,138, dated Feb. 9, 2024, pp. 1-6.

* cited by examiner

```
I = { (1,1), (1,2), (2,1) }
S = M = D_g = zeros(d1,d2)
for m = 0, 1, ..., d1; do
  for n = 0, τ_h, 2τ_h, ..., d2; do
    S(m,n) = Dg(m,n)= cos(U1(m,:), U2(n,:))
    M(m,n) = 1 for m = 0, ..., d1-2; do
  for n = 0,..., d2-2; do
    if M(m,n) ≠ 0:
      for i,j in I:
        if S(m+i,n+j) == 0:
          S(m+i,n+j) = cos(U1(m+i,:), U2(n+j,:))
        p1 = (D_g(m,n) + S(m+i, n+)]) / (M(m,n) + 1)
        if D_g(m+i,n+j) > 1; then
          p2 = D_g(m+i, n+j) / M(m+i, n+j)
        else:
          p2 = 0
        if p1 > p2 and p1 > Thr:
          M(m+i, n+j) = M(m,n) + 1
          D_g(m+i, n+j) = D_g(m,n) + S(m+i, n+j)
score = Max(M)
```

SPEAKER RECOGNITION IN THE CALL CENTER

CROSS-REFERENCE TO RELATED APPLICATIONS

This application is a continuation of U.S. patent application Ser. No. 18/329,138, filed Jun. 5, 2023, which is a continuation of U.S. patent application Ser. No. 16/895,750, now U.S. Pat. No. 11,670,304, filed Jun. 8, 2020, which is a continuation of U.S. patent application Ser. No. 16/442,368, now U.S. Pat. No. 10,679,630, filed Jun. 14, 2019, which is a continuation of U.S. patent application Ser. No. 15/709,290, now U.S. Pat. No. 10,325,601, filed Sep. 19, 2017, which claims priority to U.S. Provisional Application No. 62/396,670, filed Sep. 19, 2016, each of which is incorporated by reference in its entirety.

TECHNICAL FIELD

This application is related to methods and systems for audio processing, and more particularly to audio processing for speaker identification and verification.

BACKGROUND

Automatic speaker recognition aims to recognize people from their voices. Two standards of speaker recognition are verification and identification. The former is a 1-to-1 problem, in which the claimed identity of one speaker is verified based on previous samples provided by that speaker alone to verify an alleged identity of the speaker. The latter (identification) is a 1-to-N problem in which a speaker is evaluated against previously obtained models (also known as voiceprints or embedments) of multiple speakers in order to identify which speaker out of the N known speakers produced a particular received test sample.

Speaker identification (the 1-to-N problem) can be addressed in closed-set or open-set conditions. Closed-set identification results in identifying a speaker among known speakers. In contrast, open-set identification considers not only whether the speaker is one of the N speakers, but also if it is an unknown speaker. Both the verification and identification scenarios are important in a call center.

Speaker verification is used to authenticate a genuine known user by comparing his current voice with the voice on file for that user, while speaker identification can be used to detect a potential fraudster whose voice exists in a blacklist of the call center.

In some implementations, speaker recognition is text-dependent-which usually requires active enrollment of a speaker by asking the speaker to repeat a prompted passphrase—or text-independent, which is typical of passive recognition.

A less widely known use case of speaker recognition technology is anomaly detection, where the objective of the recognition is to detect possible fraud activities by using an incoherence between (a) voiceprint similarities and (b) available metadata such as automatic number identification (ANI) or account number (e.g., a caller's account at a bank serviced by the call center).

The inventors have devised several methods to improve call center operations using speaker recognition in novel ways.

SUMMARY

The presently claimed inventions are directed to a methods and apparatuses for use in, for example, a call center to identify speakers (e.g., an agent and caller) in a recorded or live conversation and to associate the identified speaker with their respective conversation portions.

In an exemplary embodiment, speakers in a speech signal may be distinguished and identified by obtaining the speech signal at an input, the speech signal including utterances respectively from at least a first speaker and a second speaker; extracting speech portions from the speech signal; performing speaker diarization on the speech portions, the speaker diarization identifying speech portions respectively associated with at least one of the first speaker and the second speaker; detecting at least one trigger phrase in the respective speech portions by using automatic speech recognition, each possible trigger phrase being associated with a respective prior probability that a current, next or previous utterance in the respective speech portion is an entity name; detecting at least one entity name in the respective speech portions by using automatic speech recognition; and employing a probabilistic model trained to associate at least one of the first speaker and the second speaker with a respective one of the at least one detected entity names, the probabilistic model being trained based on at least the diarized speech portions, the detected at least one trigger phrase, and the detected at least one named entity.

In an exemplary embodiment, the probabilistic model is a Bayesian network.

In an exemplary embodiment, the speaker diarization identifies speech portions respectively associated with each of the first speaker and the second speaker; and the probabilistic model is trained to associate each of the first speaker and the second speaker with a respective one of the detected entity names.

In an exemplary embodiment, performing the speaker diarization includes: periodically extracting i-vectors from the speech portions; and partitional clustering the i-vectors into respective clusters for the first speaker and the second speaker, wherein the probabilistic model associates an identification of at least one of the first speaker and the second speaker with a corresponding one of the respective clusters.

In an exemplary embodiment the first speaker is a call center agent, and the second speaker is a caller.

In an exemplary embodiment, an apparatus for distinguishing and identifying at least one of multiple speakers in a speech signal includes an input, a speech activity detector, a speaker diarization processor, an automatic speech recognition (ASR) processor, and a probabilistic model. The input is configured to receive a speech signal having utterances from at least a first speaker and a second speaker. The speech activity detector is configured to extract speech portions of the speech signal. The speaker diarization processor segregates the extracted speech portions into speech portions associated with at least one of the first speaker and the second speaker. The automatic speech recognition processor recognizes one or more predetermined trigger phrases in each speech portion, each possible trigger phrase being associated with a respective prior probability that a current, next or previous utterance in the respective speech portion is a named entity and to recognized one or more entity names each respective speech portion. The probabilistic model is trained to associate a recognized entity name with speech portions associated with at least one of the first speaker and the second speaker.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

FIGURES

FIG. 4B shows a modified dynamic time warping (DTW) algorithm according to an exemplary embodiment disclosed herein.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

DETAILED DESCRIPTION

The detailed description set forth below in connection with the appended drawings is intended as a description of exemplary embodiments of the present disclosure and is not intended to represent the only embodiments in which the present disclosure can be practiced. The term "exemplary" used throughout this description means "serving as an example, instance, or illustration," and should not necessarily be construed as preferred or advantageous over other embodiments, whether labeled "exemplary" or otherwise. The detailed description includes specific details for the purpose of providing a thorough understanding of the embodiments of the disclosure. It will be apparent to those skilled in the art that the embodiments of the disclosure may be practiced without these specific details. In some instances, well-known structures and devices may be shown in block diagram form in order to avoid obscuring the novelty of the exemplary embodiments presented herein.

A general overview of a speaker recognition system is presented first, followed by detailed description disclosing methods and apparatus for improving call center operations using speaker recognition. The inventors envision that various embodiments disclosed herein may be implemented separately, in parallel use, and/or in combinations that beneficially share resources, structure or function. It will be appreciated that not all combinations are explicitly detailed herein.

Figure 1:
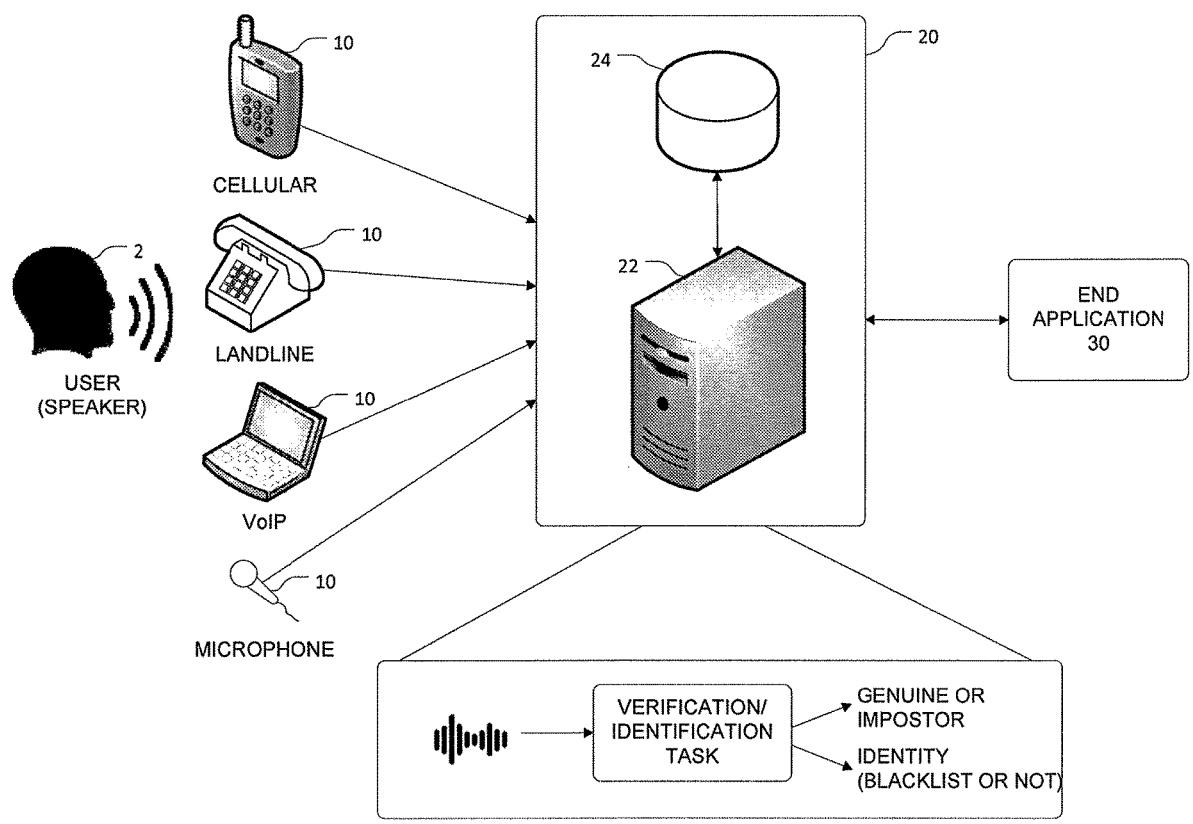
FIG. 1 is a block diagram illustrating a system for performing speaker recognition according to an exemplary embodiment of the present disclosure.

FIG. 1 is a block diagram that illustrates a system for performing speaker recognition according to an exemplary embodiment of the present invention. According to FIG. 1, a user or speaker 2 may speak an utterance into input device 10 containing an audio acquisition device, such as a microphone, for converting the uttered sound into an electrical signal. As particularly shown in FIG. 1, the input device 10 may be a device capable of telecommunications, such as a telephone (either cellular or landline) or a computer or other processor based device capable of voice over internet (VOIP) communications. In fact, it is contemplated that the present invention could be utilized specifically in applications to protect against, for example, telephone fraud, e.g., verifying that the caller is whom he/she claims to be, or detecting the caller's identity as somebody on a "blacklist" or "blocked callers list." Although it is contemplated that the input device 10 into which the recognition speech signal is spoken may be a telecommunication device (e.g., phone), this need not be the case. For instance, the input device 10 may simply be a microphone located in close proximity to the speaker recognition subsystem 20. In other embodiments, the input device 10 may be located remotely with respect to the speaker recognition subsystem.

According to FIG. 1, the user's utterance, which is used to perform speaker identification, will be referred to in this specification as the "recognition speech signal." The recognition speech signal may be electrically transmitted from the input device 10 to a speaker recognition subsystem 20.

The speaker recognition subsystem 20 of FIG. 1 may include a computing system 22, which can be a server or a general-purpose personal computer (PC). The computing system 22 may be programmed to implement the various inventive methods disclosed herein. In some embodiments, the computing system 22 may be programmed to model a deep neural network in conjunction with the inventive techniques disclosed herein.

It should be noted, however, that the computing system 22 is not strictly limited to a single device, but instead may comprise multiple computers and/or devices working in cooperation to perform the operations described in this specification. While single or multiple central processing units (CPUs) may be used as a computing device both for training and testing, graphics processing units (GPUs) may also be used. For instance, the use of a GPU in the computing system 22 may help reduce the computational cost, especially during training. Furthermore, the computing system may be implemented in a cloud computing environment using a network of remote servers.

As shown in FIG. 1, the speaker recognition subsystem 20 may also include a memory device 24 that may store program instructions for implementing the various inventive techniques. Particularly, this memory device 24 may contain a plurality of raw and/or sampled speech signals (or "speech samples") from multiple users or speakers, as well as a plurality of registered voiceprints (or "speaker models") obtained for users who have been "enrolled" into the speaker registration subsystem 20.

Referring again to FIG. 1, the results of the speaker recognition analysis can be used by an end application 30 that needs to authenticate the caller (i.e., user), i.e., verifying that the caller is whom he/she claims to be by using the testing functions described herein. As an alternative, the end application 30 may need to identify any caller who is on a predefined list (e.g., blacklist or blocked callers; or whitelist, approved callers). This can help detect a malicious caller who spoofs a telephone number to evade detection by calling line identification (CLID) (sometimes referred to as "Caller ID"). However, even though the present invention can be used by applications 30 designed to filter out malicious callers or verify approved callers, the present invention is not limited to those types of applications 30.

For instance, the present invention can be advantageously used in other applications 30, e.g., where voice biometrics are used to unlock access to a room, resource, etc. Furthermore, the end applications 30 may be hosted on a computing system as part of computing system 20 itself or hosted on a separate computing system similar to the one described above for computing system 20. The end application 30 may be also implemented on a (e.g., remote) terminal with the computing system 20 acting as a server. As another specific example, the end application 30 may be hosted on a mobile device such as a smart phone that interacts with computing system 20 to perform authentication using the testing functions described herein.

It should be noted that various modifications can be made to the system illustrated in FIG. 1. For instance, the input device 10 may transmit the recognition speech signal directly to the end application 30, which in turn relays the recognition speech signal to the speaker recognition subsystem 20. In this case, the end application 30 may also receive some form of input from the user representing a self-identification. For instance, in case of performing a speaker identification task, the end application 30 may request the user to identify him or herself (either audibly or by other forms of input), and send both the recognition speech signal and the user's alleged identity to the speech recognition subsystem 20 for authentication. In other cases, the self-identification of the user may consist of the user's alleged telephone number, as obtained by CLID. Furthermore, there is no limitation in regard to the respective locations of the various elements illustrated in FIG. 1. In certain situations, the end application 30 may be remote from the user, thus requiring the use of telecommunications for the user to interact with the end application 30. Alternatively, the user (and the input device 10) may be in close proximity to the end application 30 at the time of use, e.g., if the application 30 controls a voice-activated security gate, etc.

Figure 2:
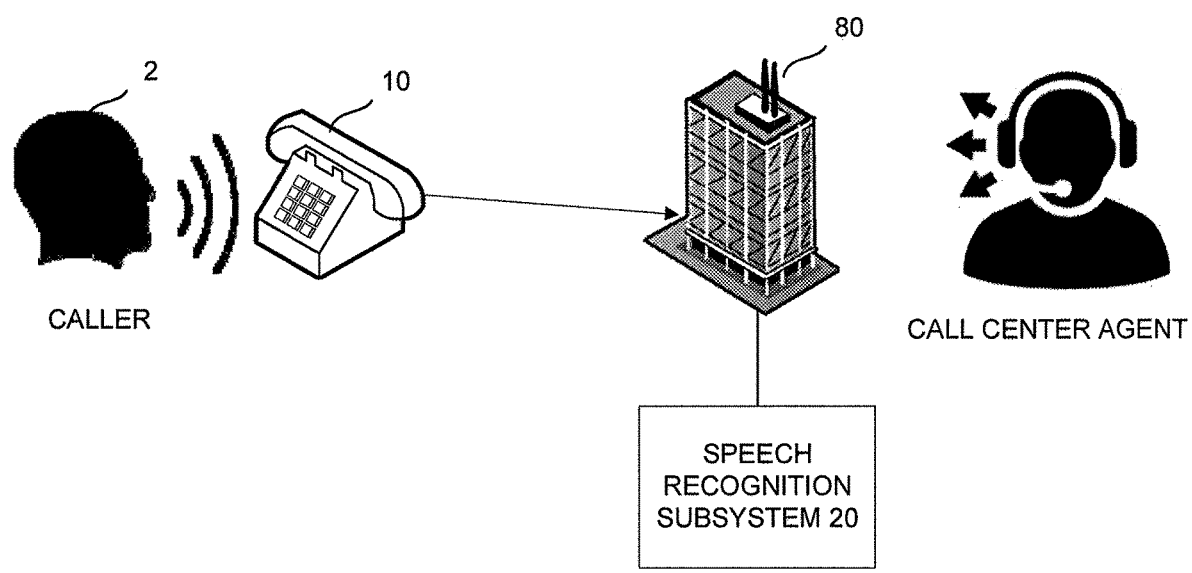
FIG. 2 illustrates a call center implementing a speech recognition system according to exemplary embodiments disclosed herein.

FIG. 2 illustrates a call center 80 implementing a speaker recognition subsystem 20. A caller 2 may contact the call center 80 to speak with a call center agent. A speech signal of at least the caller 2 may be provided by an audio capture device 10 such as a telephone, and captured and processed by the speaker recognition subsystem 20. In some instances, the call center 80 may include a speech signal of the call center agent.

A speaker recognition system such as the speaker recognition subsystem 20 described above may implement embodiments disclosed below in, e.g., a call center or collection of call centers to provide new security features or improve existing ones, to provide improved services to call center patrons, to help reduce fraud, and to provide other benefits. It will be recognized by those having skill in the art, that the embodiments disclosed herein need not be limited to call centers, and may instead be applied to other circumstances where, for example, callers are serviced in high volume, fraudulent callers may persist, and the like. Five categories of improvements are described in detail below but it is to be understood that at least some of these categories may be combined.

I. Partial Sequence Matching for Passive Speaker Recognition

Conventional passive voice recognition applications use text-independent acoustic speaker recognition systems. Those systems study the similarity between enrolment speech and test speech in the acoustic domain. However, such systems do not benefit from the similarity in content of both enrollment and test utterances, like text-dependent speaker recognition does, where a known or prompted passphrase is spoke by the user. In this case, both phonetic and acoustic factors are taken into account by the system.

Partial sequence matching for has been studied for acoustic keyword spotting. For instance, a same keyword may be expected in, and retrieved from, all speech utterances in certain settings. For example a call center for a financial institution may ask every inbound caller to state his/her name, address, account number, etc. Previous studies have described an "unbounded dynamic time warping" (UDTW) algorithm that works independently of the starting point of the keyword in the utterance. (See, Anguera, et al., "Partial Sequence Matching using an Unbounded Dynamic Time Warping Algorithm", IEEE ICASSP, 2010.) However, this technique is speaker independent. While speaker independence may be desirable in some settings (e.g., speech recognition), it is antithetical to the notion of speaker recognition.

Other studies have proposed a content-matching approach for speaker recognition. Such approaches utilize a phonetically-aware DNN system. (See Scheffer, et al., "Content Matching for Short Duration Speaker Recognition", INTERSPEECH, 2014; see also, U.S. Pat. No. 9,336,781 to Scheffer, et al.) However, such system is computationally very expensive as it requires training a DNN background model and using it to compute the required zero-order Baum-Welch statistics at both the enrollment and test time.

One of the approaches disclosed herein takes advantage of speaker dependence and presents a significant decrease in computational complexity, thus realizing a decrease in cost and an increase of efficiency. While speaker independence may be desirable in some settings, the present inventors have recognized an alternative approach that focuses on both the content and the speaker identity. Moreover, the disclosed partial sequence content matching does not require any background model and has lower CPU and memory footprint.

Figure 3:
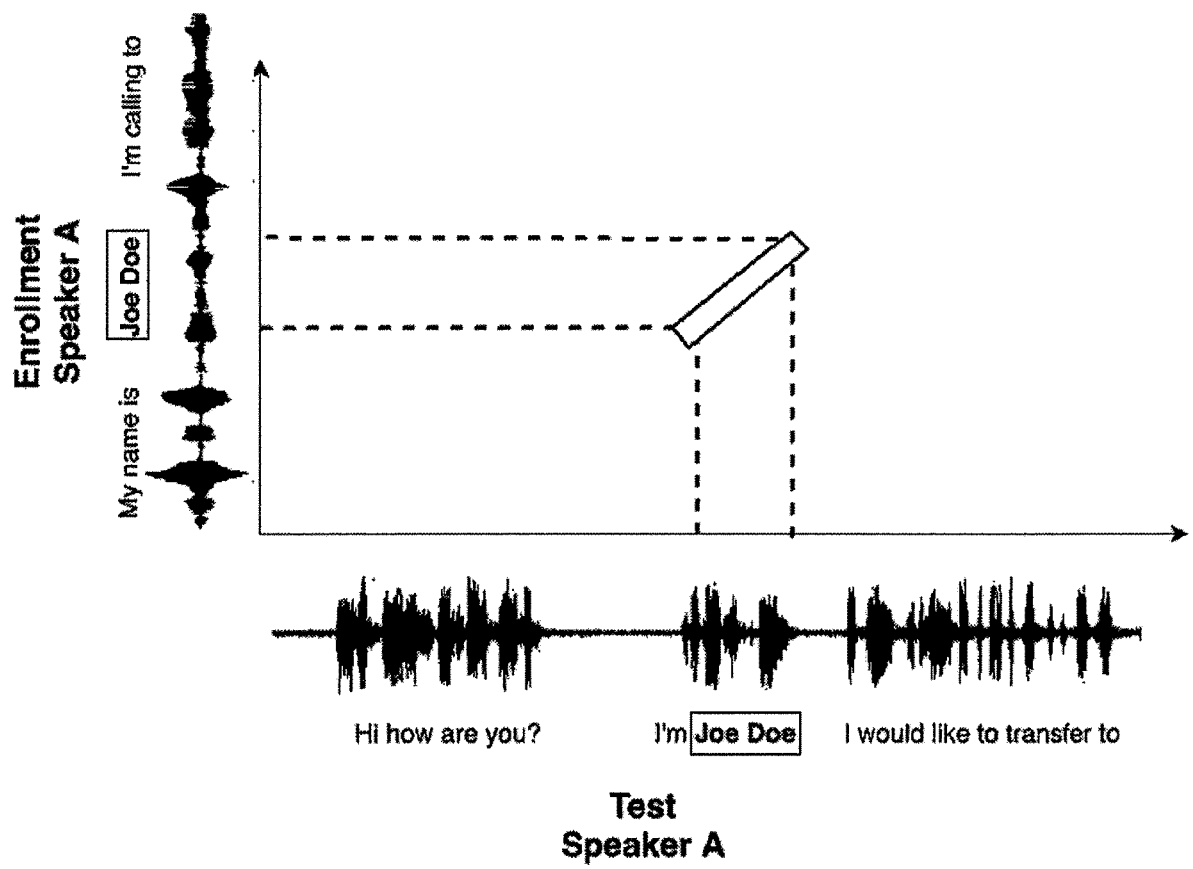
FIG. 3 illustrates a graph showing a test speech sample and an enrollment speech sample according to an exemplary embodiment herein described.

FIG. 3 illustrates a graph showing a test speech sample and an enrollment speech sample each containing a repeated phrase. A speaker may naturally (or can be prompted to)

repeat particular words (e.g. "Joe Doe" in FIG. 3) every time he calls his financial institution or his insurance company.

Figure 4A:
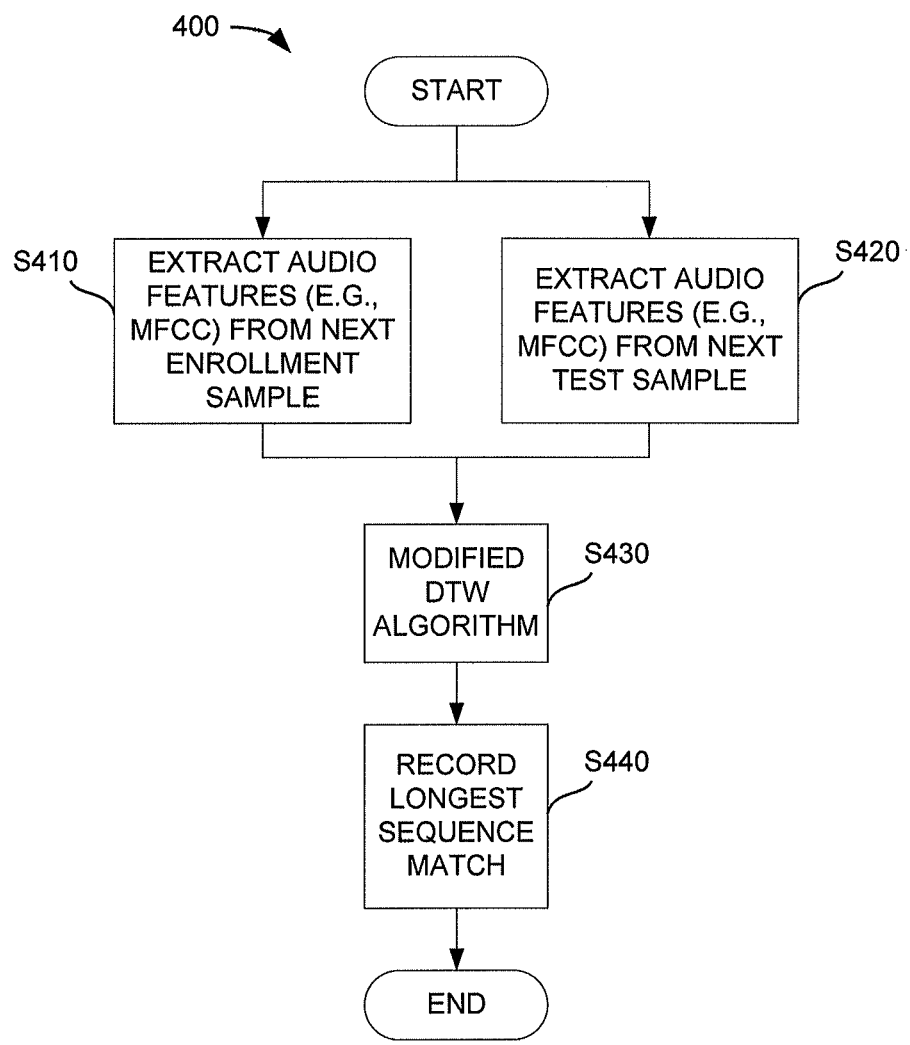
FIG. 4A is a flowchart showing a method for extracting and evaluating a partial sequence according to an exemplary embodiment herein disclosed.

FIG. 4A is a flowchart showing a method for extracting and evaluating a partial sequence according to an exemplary embodiment herein disclosed. First, the system extracts audio features (such as MFCC, LPCC, PLP, etc.) from a portion of both enrollment and test samples respectively at operations S410, S420. Although FIG. 4A shows operations S410 and S420 in parallel, it will be appreciated that they can be sequentially. It is noted that the portion from which features are extracted need not be (and typically is not) the entire conversation and can include, for example, a partial conversation. A modified DTW algorithm is performed (S430) that looks not only at the content similarity, but also on the acoustic similarity of the enrollment and test sequences. The system records (S440) the longest sequence match that defines the similarity between both utterances.

In general, dynamic time warping measures similarity between two temporal sequences (e.g., utterances) that may vary in speed. FIG. 4B shows a modified DTW algorithm 442 that may be utilized in the partial audio sequence matching disclosed herein, and which significantly reduces the complexity (and thus computation time) of a typical unmodified DTW technique, based on some assumptions. Specifically, DTW typically requires that both matching sequences start at the same time (10) and finish at approximately the same time. In contrast, the modified DTW 442 does not require a common start and end time. The modified DTW algorithm 442 computes a similarity score between matrices. Specifically, in the algorithm 442 feature matrices U1 and U2 are, respectively, an enrollment utterance and a test utterance. Lengths of the respective utterances are denoted as d1 and d2. A time unit for d1, d2 typically represents a duration of 10 milliseconds, corresponding to the hop size at which feature vectors (e.g., MFCCs) are extracted. Thr is a cut-off threshold for deciding not to pursue the search with a path (e.g., Thr=0.6). $T_h$ is the horizontal step size (e.g. $T_h$=10).

For instance, in the case of passive recognition, a fraudster may be identified not only by his voice, but also by the fraudster's repetition of specific expected words or phrases. For example, the call center of a financial institution may request a caller to repeat certain information during each call, such as a name, account number, address, or the like. Even if the fraudster has the correct information, her voice, phone, or other channel characteristics may be evaluated to identify differences from expectations.

This technique coupled with a traditional text-independent speaker recognition system such as i-vectors provides very high recognition accuracy.

II. Widely Distributed Privacy Preserving UBM Training

A conventional speaker recognition system typically uses several universal background models (UBMs). These models account for a distribution of the training data in a hope that this distribution matches the distribution of all anticipated test data. The accuracy of such system can be good when care is taken in selecting training data. However, in practice, a data mismatch is common between UBM training and its end use in testing incoming callers in every call center. In some cases, the mismatch may be due to differences in the language used (e.g. training data=English, test data=Spanish), the accent (e.g. training data=Native English, test data=Non-Native English), and/or the channel (e.g., training data=Landline telephony, test data=VoIP telephony). Such mismatches reduce the quality of speaker recognition.

In some instances domain adaptation may be used to customize the UBM for a particular domain via unsupervised approaches like hierarchical clustering or whitening. (See, e.g., Khoury, E., et al., "Hierarchical Speaker Clustering Methods for the NIST i-vector Challenge", Odyssey, 2014; and Garcia-Romero, D., et al., "Unsupervised Domain Adaptation for i-Vector Speaker Recognition". Odyssey, 2014.) However, while improvement was shown using these domain customized UBM techniques, the resulting voiceprints are limited to the corresponding domain, and typically cannot be applied to other domains. For instance, these approaches generally prevent the voiceprint extracted at Call Center A from being usefully implemented at call center B, making the detection of a particular fraudster across call centers impossible.

Obtaining the data necessary to train a UBM matched to a wide variety of call centers is prohibitive for several reasons, including the sensitivity of the call recordings which may contain Personally-Identifying Information (PII), payment card information, health information, and/or other sensitive data. Call centers may not be willing to let this data leave their premise, and even derived data used to train a UBM (such as MFCCs) may retain enough information to reconstruct the sensitive details of the recordings. The inventors have recognized a need for training a UBM appropriate for use in multiple domains, using data from a plurality of distributed participants, none of whom are willing to allow the training audio, or time-series data derived from the audio, to leave their control.

Successful learning techniques of the UBM include the use of an expectation-maximization (EM) algorithm, which aims to compute the parameters of the model such that the likelihood of those parameters is maximized over the training data. In the context of speaker recognition, techniques such as K-Means, Gaussian Mixture Model (GMM), and i-vectors each use the EM algorithm. This method includes accumulating the statistics (of a type depending on technique) of audio features with regards to the estimated model during the Expectation step. Then, those statistics are used to update the parameters of the model during the Maximization step. The process is done in an iterative manner until convergence, when the overall likelihood asymptotically reaches its maximum, or a maximum number of iterations is met.

Typically, the Expectation operation of an EM algorithm requires the use of audio features (e.g., MFCCs) to compute the accumulated statistics. The audio features are considered as sensitive data because it is possible to reverse engineering them, and thus generate the original speech signal. However, the accumulated statistics do not contain PII or other sensitive data, as the statistics are accumulated over several recordings from several speakers. Accordingly, the inventors here have devised a method for performing an EM algorithm in a distributed manner that preserves privacy.

Figure 5A:
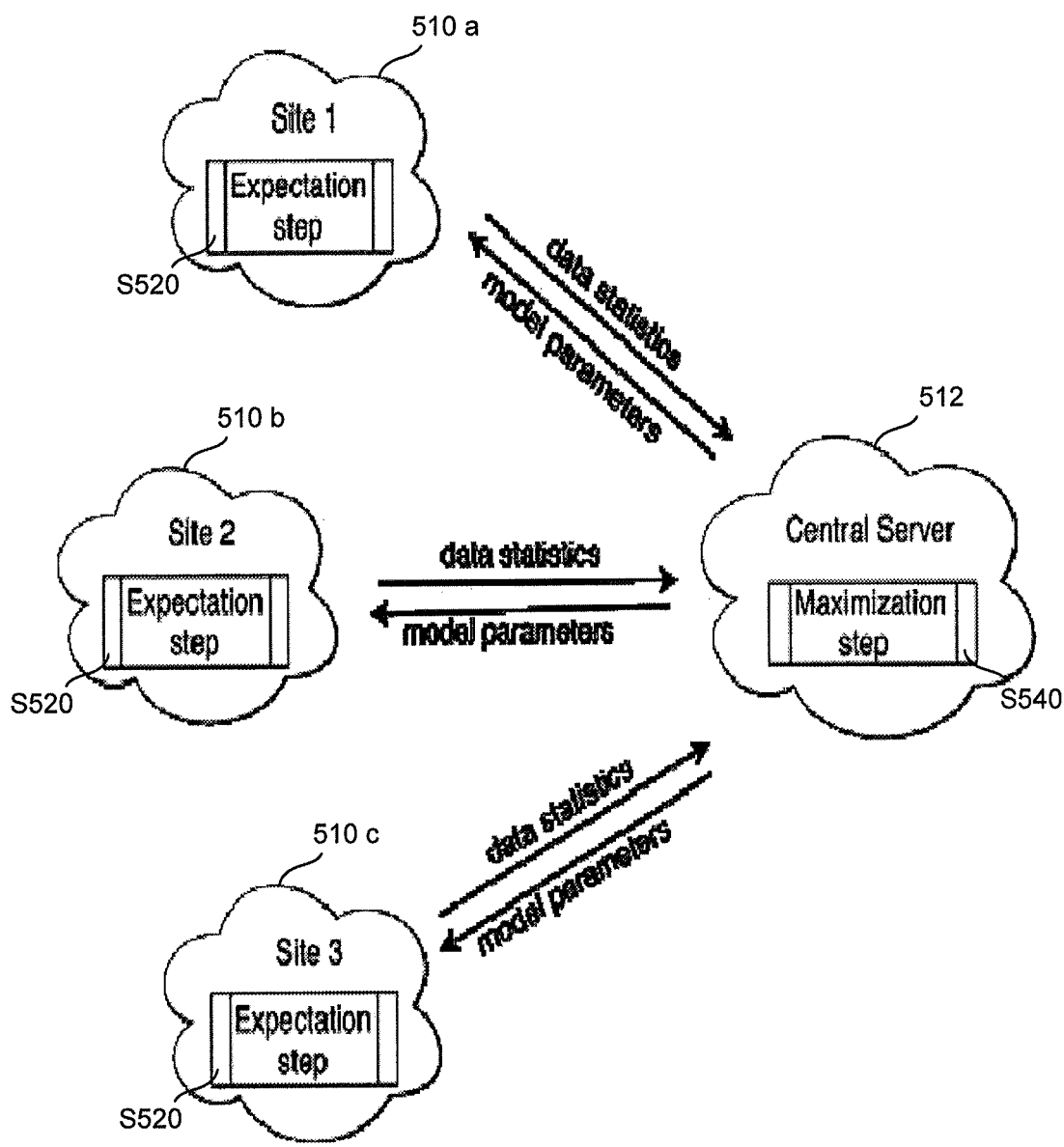
FIG. 5A is a block diagram showing a distribution of calculation according to an exemplary embodiment disclosed herein.

FIG. 5A is a block diagram 500 showing the distribution of EM algorithm to different locations preserving private information. In order to further preserve the privacy of data at each site, portions of the Expectation step S520 may be performed at the respective participant sites 510a-c, and then transfer the accumulated statistics to a central remote place, e.g., a Central Server 512, where the Maximization operation S540 is performed on the aggregate accumulated statistics.

Figure 5B:
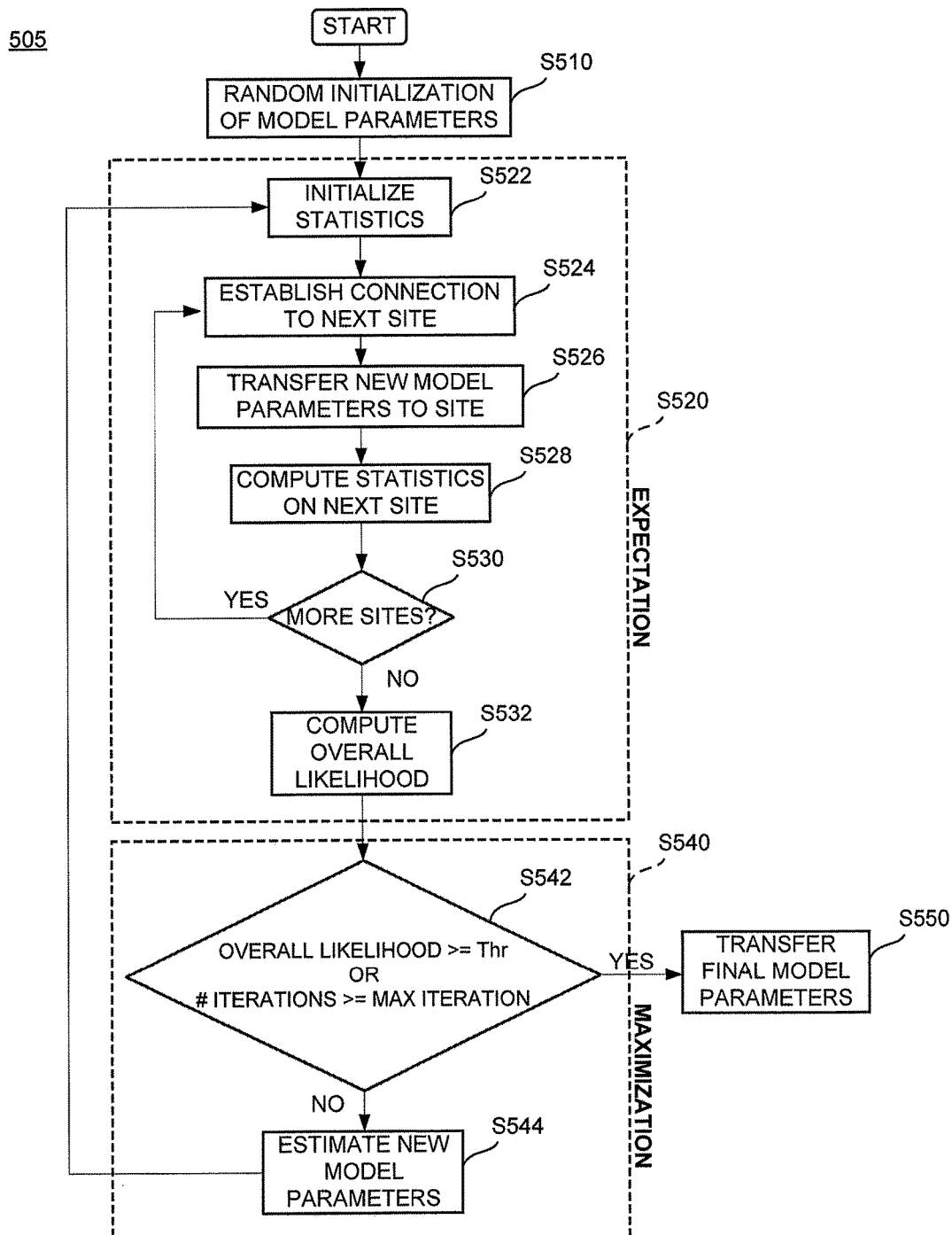
FIG. 5B is a flow chart illustrating a method for privacy preserving UBM training according to an exemplary embodiment disclosed herein.

FIG. 5B is a flow chart illustrating the method 505 for privacy preserving UBM training performed, in one non-limiting example, at a central server (580 in FIG. 5B). In operation S510, model parameters are initialized to semirandom states. An Expectation operation S520 is then performed, followed by Maximization operation S540. The Expectation operation S520 includes several sub-operations. In operation S522, statistics are initialized. In operation S524, connection is established with an initial or next site (e.g., one of the participant sites 570a-c in FIG. 5B). In operation S526 new model parameters (established in operation S510) are transferred to the connected next site. In operation S528, statistics are computed on-site (i.e., at the subject participant site). If another participate site is to be included in the expectation operation S520, operations S524 through S528 are repeated (see S530). In operation S532 the overall likelihood is computed. In the maximization operation S540, the computed overall likelihood is compared with a threshold likelihood, Thr. If the likelihood satisfies the threshold, the final model parameters are transferred (S550) to all of the participant sites 570a-c. Otherwise, new model parameters are estimated (S544) and the expectation step S520 is repeated presented using the new model parameters.

Other than preserving the privacy of the participants, the disclosed technique benefits from a low data transfer requirements, since the size of the accumulated statistics is much smaller than audio files and even the derived spectral or phonetic features.

To ensure the portability of voiceprints and at the same time reduce domain mismatch, embodiments disclosed herein include a widely distributed UBM training across call centers. This training is done in a privacy preserving fashion that does not require transfer of any sensitive data outside the call center (or analogous institution).

III. Agent vs. Caller Identification

Another problem seen at many call centers involves inability to identify multiple callers in a same call. Most call center interactions include at least two actors: a call-center agent and a caller. At least for storage efficiency purposes, recordings of audio calls are often compressed in a monochannel format that includes the entire conversation rather than recording each call participant in a distinct audio channel (e.g., stereo). However, this practice makes difficult the later use of the audio recording for analysis and information retrieval because retrieving "who spoke and when?" is not straightforward.

Conventional speaker diarization techniques partially answer the question of "when" by segmenting a monochannel audio recording into homogeneous audio turns (e.g., agent's turn, caller's turn) and then separating those turns into respective clusters (e.g., C1 and C2), where one cluster ideally corresponds to the agent and the other cluster to the caller. However, speaker diarization merely notes a change of call participant—it does not identify the participants respectively associated with the first and second clusters.

Another conventional approach combines automatic speech recognition (ASR), speaker diarization and named entity recognition in order to recognize respective speakers. (See Khoury, et al., "Combining Transcription-based and Acoustic-based Speaker Identifications for Broadcast News", ICASSP, 2012.) However, that system requires a supervised training algorithm with multiple speakers, is based on a Gaussian Mixture Model-Hidden Markov Model (GMM-HMM), the diarization part is based on Bayesian information criterion (BIC) segmentation and clustering followed by cross-likelihood ration (CLR) clustering, and uses belief functions.

The inventors have recognized a different approach for identifying speakers associated with particular turns of conversation that improves the recognition accuracy of Caller identification and Agent identification. For instance, this is very important in cases where it is desirable to discard portions of the call in which an agent is speaking in order to better assess fraud detection on the portion of the call when the Caller is speaking. Specifically, the present disclosure describes embodiments that solve this problem by combining speaker diarization with automatic speech recognition and evaluates the progress of the call and the turn of phrases using a probabilistic model, such as a Bayesian network or a Hidden Markov Model.

Figure 6:
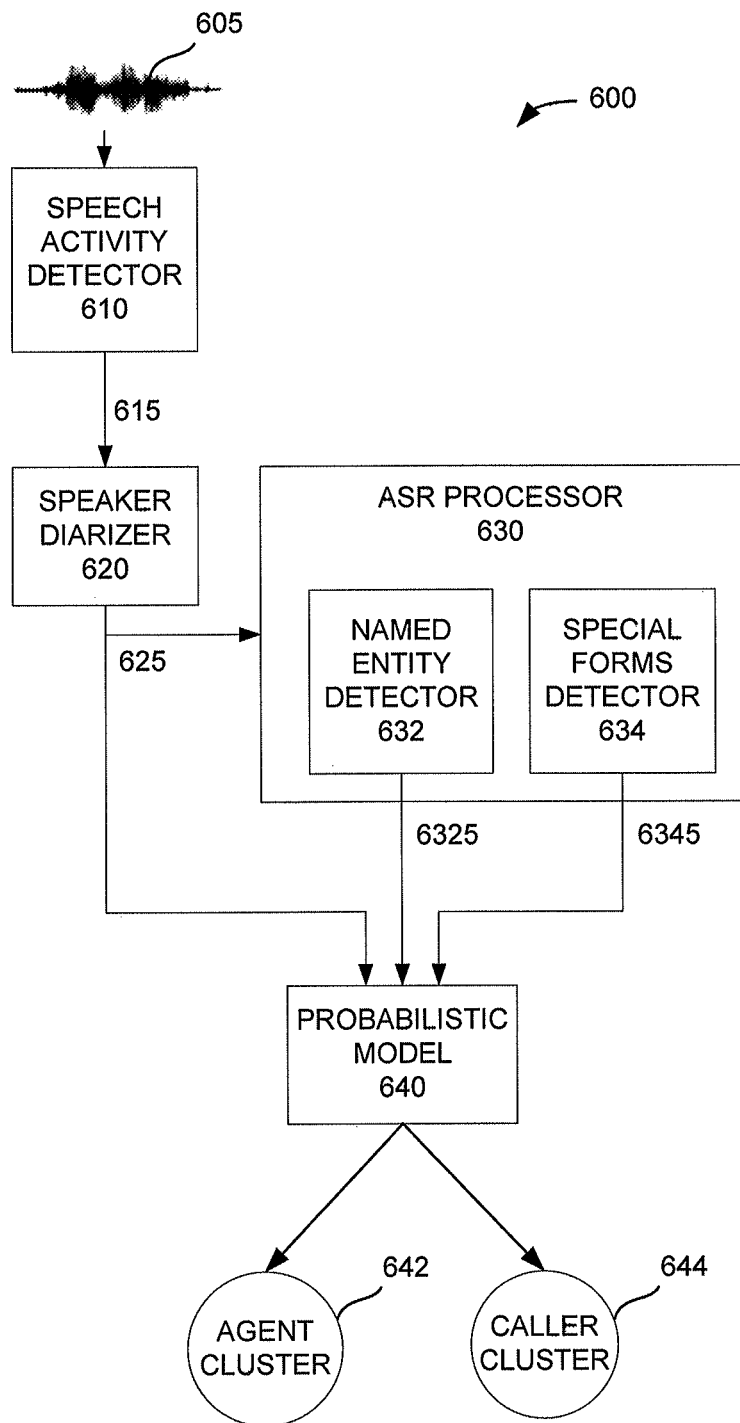
FIG. 6 is a block diagram illustrating an architecture for agent vs. caller identification.

FIG. 6 is a block diagram illustrating an architecture 600 for agent vs. caller identification. According to some embodiments, a GMM-based speech activity detector (SAD) 610 is first applied to an input speech signal 605 to discard the non-speech part. This is followed by speaker diarization processor 620 that operates on the remaining speech portion 615 received from the SAD 610. The speaker diarization processor 620 may operate to create a plurality of clusters 625 respectively associated with number of speakers in the remaining speech portion 615 based on a partitional clustering of i-vectors extracted periodically (e.g., every 2 seconds where the number of clusters is set to 2). After diarization, an automatic speech recognition (ASR) processor 630 recognizes the text content of the speech in each of the clusters 625 generated by the speaker diarization processor 620. The ASR processor 630 may implement, for example, a deep neural network (DNN) to effect a named entity detector 632 and a special forms detector 634. The named entity detector 632 may extract an entity name 6325, such as a first and/or last name, name of an institution, etc. The special forms extractor 634 may extract a word or phrase (special form) 6345 associated as a prompt or trigger associated with the entity name 6325. For example, the special form 6345 may be one of a set of special forms (e.g. "My name is" or "what's your name") each associated with a prior probability that the current, next or previous utterance being spoken by the caller or the agent is an entity name 6325. In some embodiments, the ASR processor 630 may create a transcript of all the speech in the clusters 625, and the named entity detector 632 and special forms detector 634 may operate to identify the entity name 6325 and/or special form 6345 in the transcript. Once the clusters 625, named entity 6325 and special forms 6345 are available, a probabilistic model 640 such as a Bayesian network or Hidden Markov Model can be trained. The trained probabilistic model 640 outputs the clusters in association with an identity of a corresponding speaker. For example, a cluster 642 may be associated specifically with an agent and another cluster 644 may be associated with a caller based on the probabilistic model 640.

Figure 7:
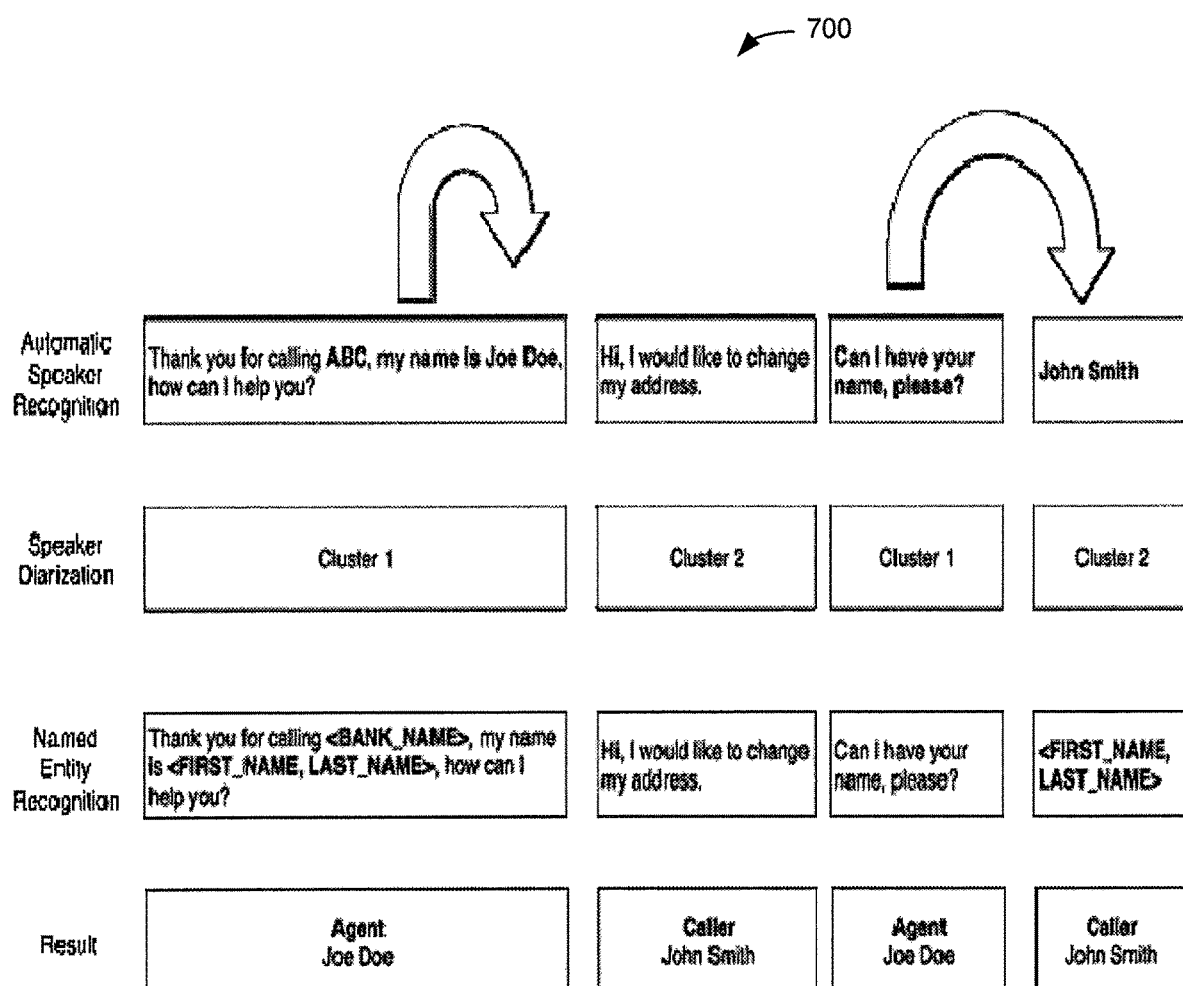
FIG. 7 is a partial flow diagram 700 illustrating an example of agent vs. caller identification according to an exemplary embodiment disclosed herein.

FIG. 7 is a partial flow diagram 700 illustrating an example of agent vs. caller identification. In the first row, the text "my name is" is recognized by the ASR (e.g., 630) as a special form 6345, indicating with high probability that the next utterance, "Joe Doe" is an entity name 6325. Likewise, the phrase "Can I have your name, please?" is identified as a special form 6345 with a high probability that the response "John Smith", from a different speaker, is likely to be an entity name 6325. It may also be seen that the text "Thank you for calling" is a special form suggesting that the next utterance, "ABC" is an entity name. In the second row, speaker diarization is illustrated, breaking down the text from the ASR 630 into clusters associated with different speakers. For example, the first and third speaking "turns" are identified as being from a same speaker and are associated with cluster 1, whereas the second and fourth speaking turns are identified as being from a different speaker and are associated with cluster 2.

In some embodiments, the agent vs. caller identification may focus on identifying just the caller, once diarization is complete, as the agent may be known and readily identified using other data. In such case the system may be configured to quickly verify the agents' already known identity against samples of a particular cluster, so that focus may be placed on identifying the caller associated with a different cluster. However, in practice it has been noted that, while the agent is often the speaker who speaks first, this is not an assumption that be relied upon. Sometimes the caller is talking before the agent (for example, if the call is carried on from IVR, speaking to check if the agent is hearing/available). Add to this the errors that can occur in speaker diarization, which sometimes mistakenly associate the first few seconds of speech with the caller cluster instead of the agent cluster.

IV. Large-Scale Speaker Identification

Speaker identification is a 1:N problem (i.e., matching a speaker to one of a number N of voiceprints). If N is small (typically <1000), a linear search for the best match is affordable. However, speaker identification does not scale well to large numbers of enrolled speakers (e.g., N>1000), primarily due to the cost of computing similarity between the probe and a large number of speaker models. Specifically, if N becomes very large (e.g. sometimes exceeding tens of millions of customers for large financial institutions), a linear search becomes too costly. Thus, a solution is needed for reducing the time and/or computation necessary for identifying the speaker. One conventional approach involves applying i-vectors with a cosine-based similarity metric, and locality sensitive hashing (LHS) for fast nearest neighbor search in high dimensional space. (See Schmidt, et al. "Large-scale speaker identification." ICASSP, 2014.) Another approach applies non-parametric hashing approaches. (See Sturim, D., et al., "Speaker Linking and Applications Using Non-Parametric Hashing Methods", Interspeech, 2016.)

I-vectors exhibit strong locality, as evidenced by success of simple similarity metrics (e.g. cosine) as classifiers. Therefore, locality of i-vectors may be exploited to coarsely prune the speaker model search space before executing more precise (and expensive) computations. This first step is achieved by treating speaker identification as an information retrieval problem.

Approximate Nearest Neighbor algorithms are one class of information retrieval algorithms that can be applied in this way. Spectral hashing and its extension, multi-dimensional spectral hashing, are two such Approximate Nearest Neighbor algorithms that are suitable for i-vector search space reduction.

Figure 8A:
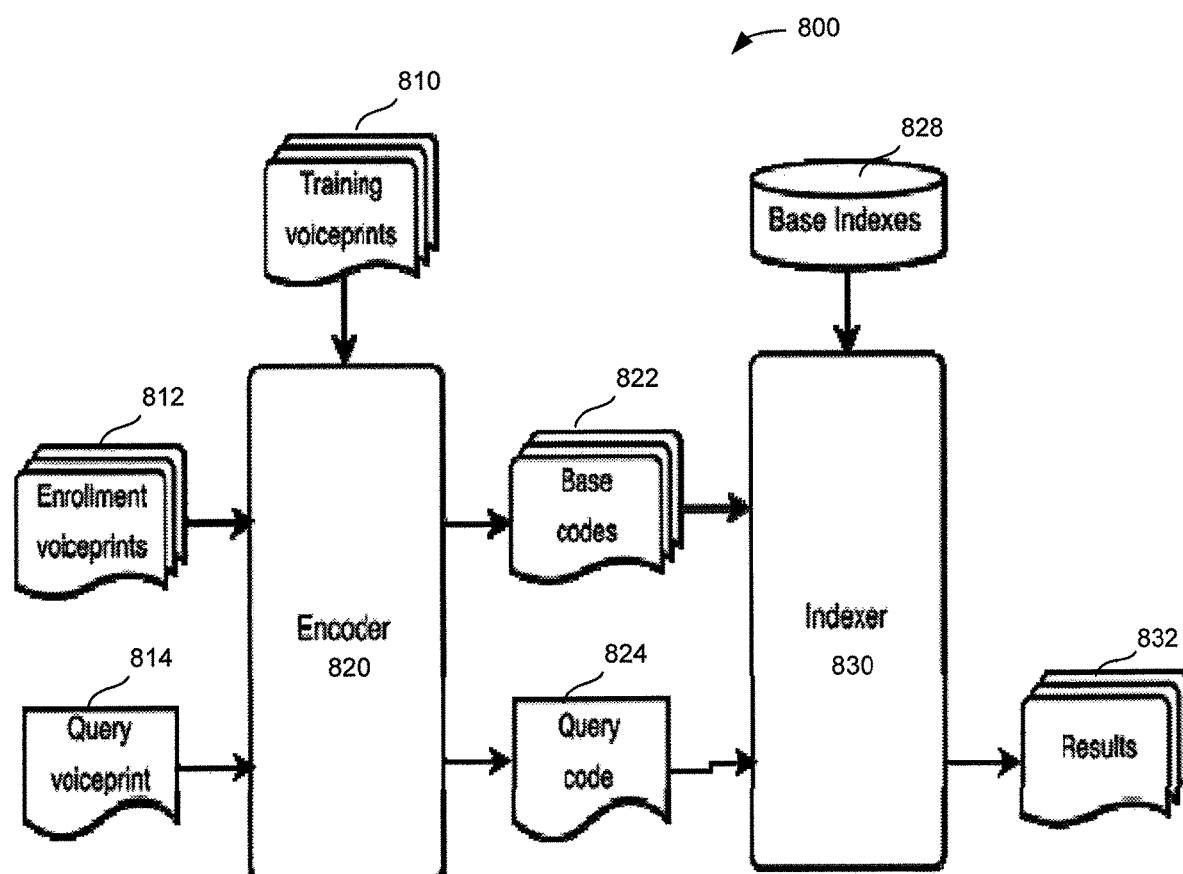
FIG. 8A is a block diagram illustrating a pipeline for training (encoding and indexing) and testing according to an exemplary embodiment disclosed herein.

FIG. 8A is a block diagram illustrating an exemplary pipeline 800 for training (encoding and indexing) and testing. For the spectral hashing algorithm, a small set of i-vectors are used to train an encoder 820 that produces similar binary codes (e.g., base codes 822) for similar i-vectors. This encoder 820 is used together with an indexer 830 to index a larger set of i-vectors (e.g., training voiceprints 810), such that the index can be efficiently searched for the top K most similar i-vectors (typically enrollment voiceprints 812) to a particular test i-vector (query voiceprint 814). These K i-vectors are each verified (or eliminated) using a more precise (and expensive) technique, such as PLDA, SVM, and other classifiers. K is chosen to maximize recall of matching speaker i-vectors (e.g., enrollment voiceprints 812) while maintaining a reasonable bound on the cost of the more precise search. While the inventors developed this method using i-vectors, it is recognized that the method is applicable to any speaker-dependent feature vector that exhibits strong locality.

Figure 8B:
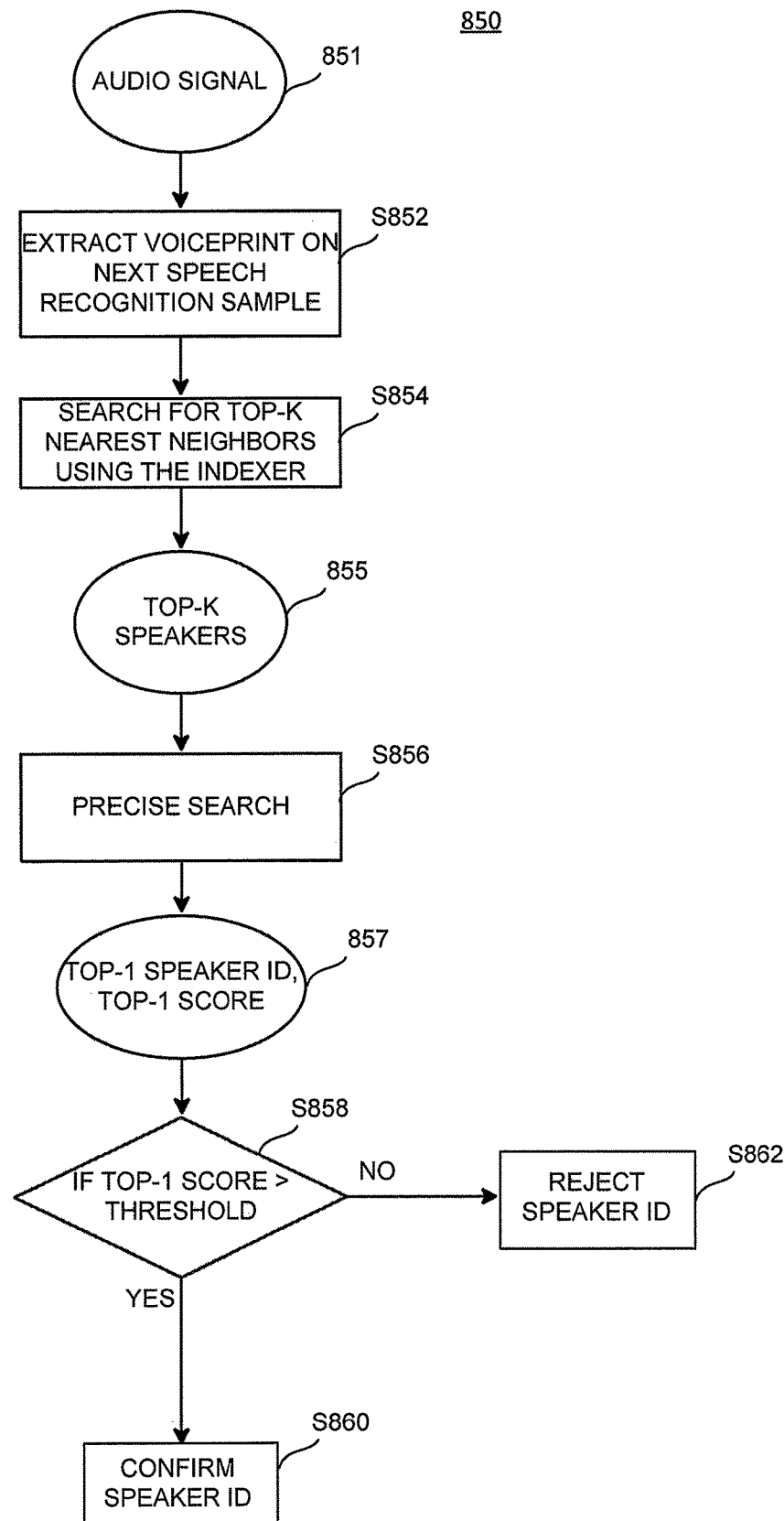
FIG. 8B is a flowchart illustrating a training and testing process corresponding to the pipeline in FIG. 8A, according to an exemplary embodiment disclosed herein.

FIG. 8B is a flowchart illustrating a training and testing process 850 corresponding to the pipeline 800 described above. In operation S852 a voiceprint is extracted from a speech recognition sample of audio signal 851. In operation S854, the indexer (830 in FIG. 8A) searches for the top K nearest neighbors. The result of that search identifies the top K speakers 855. In operation S856, a precise search is performed to identify the best (top-1) speaker similarity, i.e., identifying the best matched speaker 857, as well as producing a similarity score for the identified top-1 speaker. The precise search algorithm will loop over all top-K nearest neighbors, and compute the similarity score between the test voiceprint and those neighbors. It will sort the neighbors according to the computed similarities. The neighbor with the highest similarity will be the top-1 speaker. The similarity score could be computed using PLDA, Cosine similarity or SVM. The similarity score for the top one speaker is evaluated against a predetermined threshold (S858), and if the threshold is satisfied the speaker identification is confirmed (S860). Otherwise, the speaker identity is rejected (S862).

Spectral Hashing (SH) outperforms other approaches such as LSH or Non-parametric hashing approaches, the only approaches conventionally used for speaker recognition. The inventors have also found that a Product Quantization (PQ) approach may be implemented for accuracy similar to SH, but with faster performance at indexing and test times. It will be recognized that FIG. 8A is applicable to both approaches.

V. Fraud Call Detection by Voiceprint Anomaly

Call centers, for example of financial institutions, regularly receive fraudulent calls, where a fraudulent caller impersonates a genuine caller, e.g., an account holder, for illicit purposes. When applying speaker recognition in a call center, it is possible to benefit from some cues to improve the accuracy of speaker recognition. For example, the call center may use speaker recognition system to verify the caller and may pair this verification with other information such as an ANI, expected channel or phone characteristics, or the like to detect an anomaly in the call.

Figure 9A:
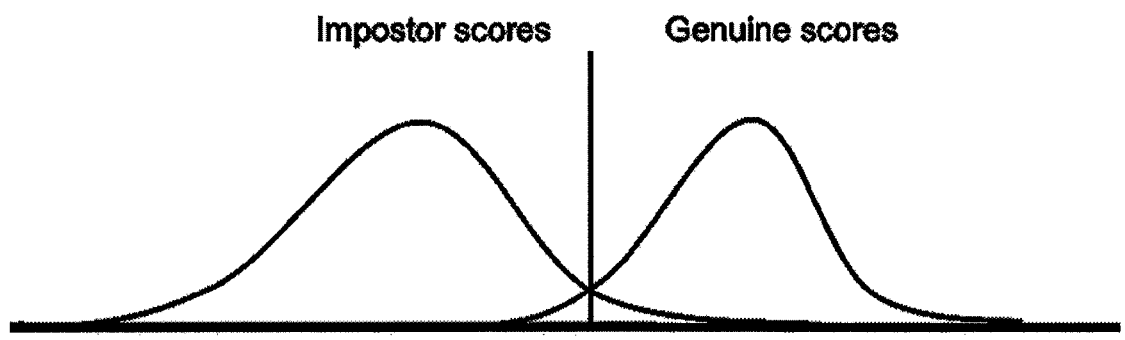
FIGS. 9A-9C illustrate score distributions for anomalous calls in a call center according to exemplary embodiments disclosed herein.

Beyond verification or identification scenario, voiceprints can be used for anomaly detection, and this technique can be applied to detect first-occurring fraud activity. In a call center, it is very common that two calls that have the same phone number come from same speakers ("Genuine scores" curve in FIG. 9A), and conversely two calls coming from two different phone numbers correspond to different speakers ("Imposer scores" curve in FIG. 9A). Additionally, it is very uncommon that typical genuine callers call their bank very often (e.g., some fraudsters call the bank more than 200 times in less than a week). These assumptions may be considered to be the "normal" condition. Thus if this normal condition is not met, an anomaly is probably occurring.

Such anomalies may be detected by a speaker recognition system. Specifically, a speaker may be verified or identified based in part on the ANI of the caller.

For example, enrolled voiceprints may be indexed to one or more ANIs. Thus, when the voiceprint and/or associated ANI of a caller does not match an enrolled voiceprint and/or associated ANI, the likelihood that the caller is potential fraudsters. That is, if the caller's voiceprint (a) cannot be verified, (b) does not match the voiceprint associated with caller's ANI, (c) can be verified but does not match the indexed ANI associated with the voiceprint, or (d) has been identified more than a predetermined threshold number in a particular period of time, the call center may implement additional measures to determine authenticity of the call or may deny service. This technique could be very important to detect a first occurrence of fraud activity.

Figure 9B:
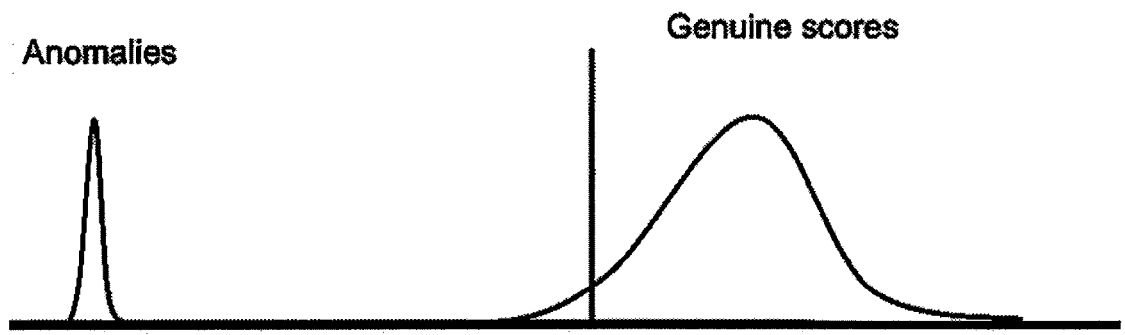
Figure 9C:
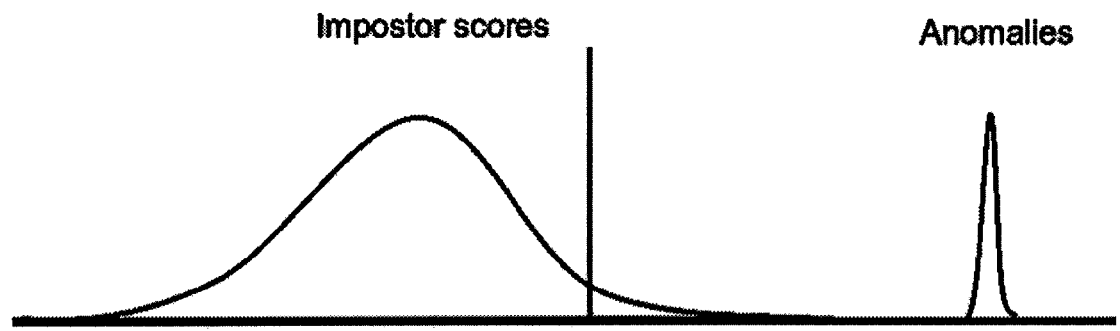

Practically, a voiceprint anomaly is detected if:

the matching score between a call and the model of its phone number (false negative matches) is very low compared to the normal distribution of true positive matches (FIG. 9B), or the matching score between a call and the model of a different phone number is very high compared to the normal distribution of true negative matches (FIG. 9C).

In the preceding detailed description, various specific details are set forth in order to provide an understanding of improvements for speaker recognition in a call center, and describe the apparatuses, techniques, methods, systems, and computer-executable software instructions introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

The present invention and particularly the speaker recognition subsystem 20 generally relates to an apparatus for performing the operations described herein. This apparatus may be specially constructed for the required purposes such as a graphics processing unit (GPU), digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a computer readable storage medium, such as, but is not limited to, any type of disk including optical disks, CD-ROMs, magneto-optical disks, read-only memories (ROMs), random access memories (RAMs), EPROMS, EEPROMs, magnetic or optical cards, integrated memory, "cloud" storage, or any type of computer readable media suitable for storing electronic instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method comprising:

obtaining, by a computer, an enrollment audio sample having an enrollment utterance of a first speaker and a test audio sample including a test utterance of a second speaker;

extracting, by the computer, an enrollment voiceprint for the first speaker using one or more acoustic features of the enrollment utterance of the first speaker, and a first content sequence of one or more expected words using the enrollment utterance;

extracting, by the computer, a test voiceprint for the second speaker using the one or more acoustic features of the test utterance of the second speaker, and a second content sequence of one or more test words using the test utterance;

determining, by the computer, an acoustic similarity for the enrollment utterance and the test utterance based on comparing the enrollment voiceprint against the test voiceprint;

determining, by the computer, a content similarity for the enrollment utterance and the test utterance based on comparing the first content sequence against the second content sequence; and identifying, by the computer, the second speaker as the first speaker based upon the acoustic similarity and the content similarity.

2. The method according to claim 1, further comprising extracting, by the computer, one or more speech portions including one or more enrollment utterances for the first speaker from the enrollment audio sample.

3. The method according to claim 1, further comprising extracting, by the computer, one or more speech portions including one or more test utterances for the second speaker from the test audio sample.

4. The method according to claim 3, further comprising executing, by the computer, speaker diarization on the one or more speech portions, the speaker diarization identifying the test utterance associated with the second speaker in the test audio sample.

5. The method according to claim 1, wherein determining the content similarity includes:
executing, by the computer, a modified dynamic time warping process on at least a portion of the enrollment audio sample; and
executing, by the computer, the modified dynamic time warping process on at least a portion of the test audio sample.

6. The method according to claim 1, wherein determining the content similarity includes detecting, by the computer, at least a partial content sequence match between the one or more expected words of the enrollment utterance and the one or more test words of the test utterance.

7. The method according to claim 6, wherein the partial content sequence match includes the one or more expected words in the enrollment utterance and the one or more test words in the test utterance, the one or more expected words being the same as the one or more test words.

8. The method according to claim 1, wherein determining the acoustic similarity includes detecting, by the computer, a speaker match between the first speaker and the second speaker based upon the test voiceprint of the second speaker having a distance to the enrollment voiceprint of the first speaker satisfying a speaker-match threshold.

9. The method according to claim 1, wherein an acoustic feature of the one or more acoustic features includes at least one of mel-frequency cepstral coefficients (MFCCs), linear predictive cepstral coefficients (LPCCs), or perceptual linear prediction (PLP).

10. The method according to claim 1, wherein the one or more expected words of the first content sequence for the enrolled speaker includes at least one of a trigger phrase or an entity name associate with the first speaker.

11. A system comprising:
a computer comprising a processor, configured to:
obtain an enrollment audio sample having an enrollment utterance of a first speaker and a test audio sample including a test utterance of a second speaker;
extract an enrollment voiceprint for the first speaker using one or more acoustic features of the enrollment utterance of the first speaker, and a first content sequence of one or more expected words using the enrollment utterance;
extract a test voiceprint for the second speaker using the one or more acoustic features of the test utterance of the second speaker, and a second content sequence of one or more test words using the test utterance;
determine an acoustic similarity for the enrollment utterance and the test utterance based on comparing the enrollment voiceprint against the test voiceprint;
determine a content similarity for the enrollment utterance and the test utterance based on comparing the first content sequence against the second content sequence; and
identify the second speaker as the first speaker based upon the acoustic similarity and the content similarity.

12. The system according to claim 11, wherein the computer is further configured to extract one or more speech portions including one or more enrollment utterances for the first speaker from the enrollment audio sample.

13. The system according to claim 11, wherein the computer is further configured to extract one or more speech portions including one or more test utterances for the second speaker from the test audio sample.

14. The system according to claim 13, wherein the computer further configured to execute speaker diarization on the one or more speech portions, the speaker diarization identifying the test utterance associated with the second speaker in the test audio sample.

15. The system according to claim 11, wherein when determining the content similarity the computer is configured to:
execute a modified dynamic time warping process on at least a portion of the enrollment audio sample; and
execute the modified dynamic time warping process on at least a portion of the test audio sample.

16. The system according to claim 11, wherein when determining the content similarity the computer is configured to detect at least a partial content sequence match between the one or more expected words of the enrollment utterance and the one or more test words of the test utterance.

17. The system according to claim 16, wherein the partial content sequence match includes the one or more expected words in the enrollment utterance and the one or more test words in the test utterance, the one or more expected words being the same as the one or more test words.

18. The system according to claim 11, wherein when determining the acoustic similarity the computer is configured to detect a speaker match between the first speaker and the second speaker based upon the test voiceprint of the second speaker having a distance to the enrollment voiceprint of the first speaker satisfying a speaker-match threshold.

19. The system according to claim 11, wherein an acoustic feature of the one or more acoustic features includes at least one of mel-frequency cepstral coefficients (MFCCs), linear predictive cepstral coefficients (LPCCs), or perceptual linear prediction (PLP).

20. The system according to claim 11, wherein the one or more expected words of the first content sequence for the enrolled speaker includes at least one of a trigger phrase or an entity name associate with the first speaker.

* * * * *